(12) United States Patent
Yano et al.

(10) Patent No.: US 6,381,417 B1
(45) Date of Patent: Apr. 30, 2002

(54) DATA READING APPARATUS

(75) Inventors: Masayuki Yano, Hiji-machi; Hidetoshi Masuda, Kawasaki, both of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/426,694

(22) Filed: Oct. 25, 1999

(30) Foreign Application Priority Data

Nov. 4, 1998 (JP) ............................................. 10-327525
Mar. 10, 1999 (JP) ............................................. 11-062552

(51) Int. Cl.⁷ ................................................. G03B 7/24
(52) U.S. Cl. ........................ 396/207; 396/408; 396/515; 396/538; 396/390
(58) Field of Search ............................ 396/6, 512, 515, 396/429, 390, 207, 408, 538

(56) References Cited

U.S. PATENT DOCUMENTS 5,541,681 A * 7/1996 Cocca e tal. ................. 396/515
5,815,751 A * 9/1998 Ogino et al. ................. 396/207
5,857,124 A * 1/1999 Yun ............................. 396/390
5,918,080 A * 6/1999 Yoshida ....................... 396/207

FOREIGN PATENT DOCUMENTS

JP            38485 A   *   2/1999

\* cited by examiner

*Primary Examiner*—D. Rutledge
(74) *Attorney, Agent, or Firm*—Robin, Blecker & Daley

(57) ABSTRACT

A data reading apparatus adapted for a film cartridge having a data recording part provided on a predetermined moving member includes a first data reading device which reads data from the data recording part moving, a second data reading device which reads data from the data recording part moving and which is disposed at a position different from that of the first data reading device with respect to a moving direction of the data recording part, and a data obtaining circuit which makes a comparison between data read by the first data reading device, and data read by the second data reading device and obtains, on the basis of a result of the comparison, data corresponding to data recorded on the data recording part, if the data read by the first and second data reading devices are identical.

14 Claims, 21 Drawing Sheets

FIG. 11 a : PIDDC LIGHT-RECEIVING DETECTION LEVEL
b : PIDDA LIGHT-RECEIVING DETECTION LEVEL
c : PIDDC LIGHT-EMISSION LEVEL
d : PIDDA LIGHT-EMISSION LEVEL
e : PIDDC PULSE-WIDTH TIME (13 AREAS FOR t1 ~ t13)
f : DDC_ELC_NEW (3 bits)    g : DDC_GC1_NEW (5 bits)    h : DDC_GC2_NEW (5 bits)
i : DDC_ELC_OLD (3 bits)    j : DDC_GC1_OLD (5 bits)    k : DDC_GC2_OLD (5 bits)
l : PIDDC_EC (PIDDC EDGE COUNTER)
m : PIDDA_EC (PIDDA EDGE COUNTER)

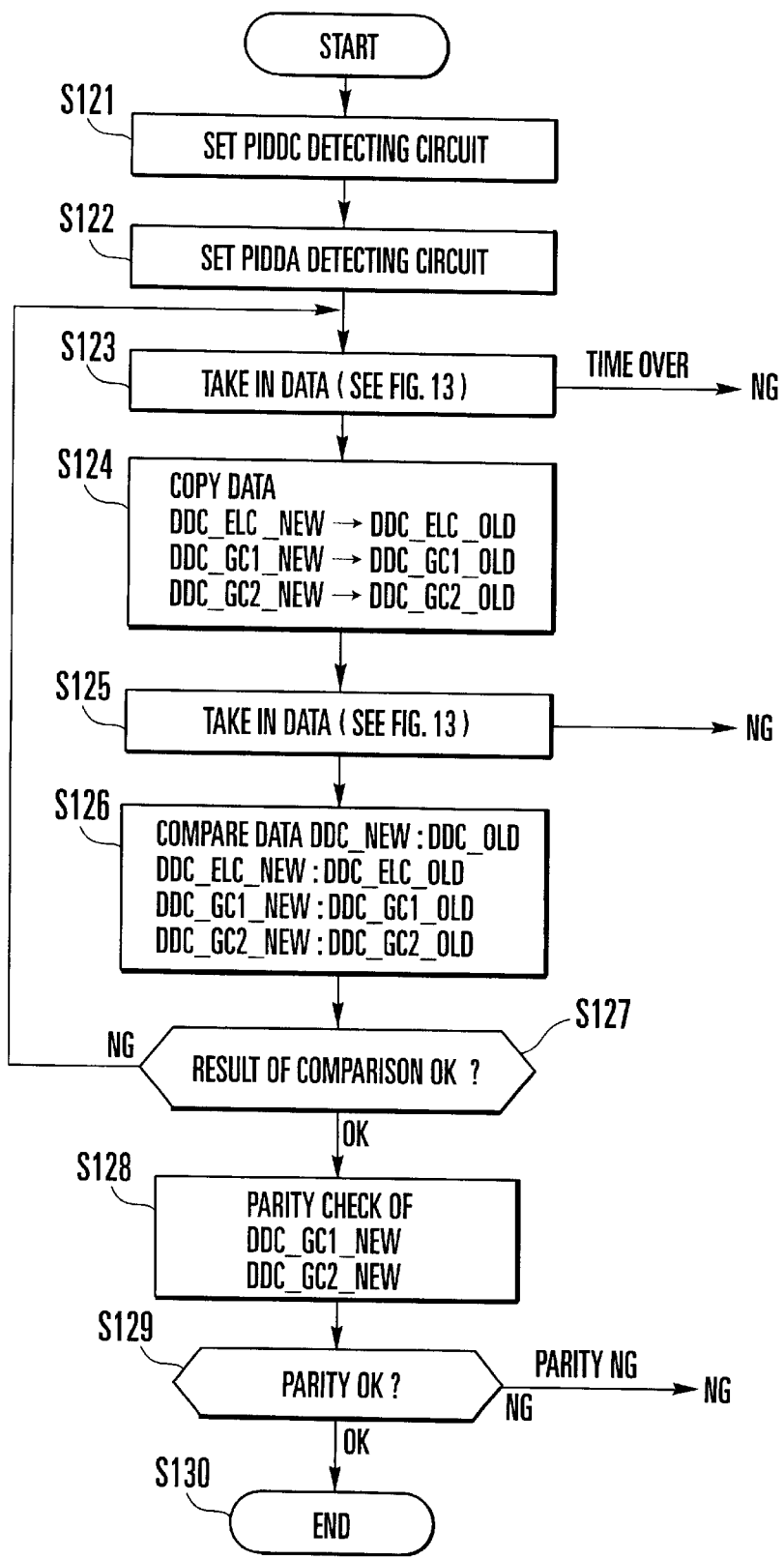

FIG. 16 a : PIDDC LIGHT-RECEIVING DETECTION LEVEL
b : PIDDA LIGHT-RECEIVING DETECTION LEVEL
c : PIDDC LIGHT-EMISSION LEVEL
d : PIDDA LIGHT-EMISSION LEVEL
e : PIDDC PULSE-WIDTH TIME (13 AREAS FOR t1 - t13)
f : DDC_ELC_NEW (3 bits)   g : DDC_GC1_NEW (5 bits)   h : DDC_GC2_NEW (5 bits)
i : DDC_ELC_OLD (3 bits)   j : DDC_GC1_OLD (5 bits)   k : DDC_GC2_OLD
l : PIDDC_EC (PIDDC EDGE COUNTER)
m : PIDDA_EC (PIDDA EDGE COUNTER)

n : PIDDA PULSE-WIDTH TIME (13 AREAS FOR t1 - t13)
o : DDA_ELC_NEW (3 bits)   p : DDA_GC1_NEW (5 bits)   q : DDA_GC2_NEW (5 bits)
r : DDA_ELC_OLD (3 bits)   s : DDA_GC1_OLD (5 bits)   t : DDA_GC2_OLD (5 bits)
u : PIDDC_endf (PIDDC COUNT END FLAG)
v : PIDDA_endf (PIDDA COUNT END FLAG)

DATA READING APPARATUS

BACKGROUND OF THE INVENTION

1. Field of the Invention

The present invention relates to a data reading apparatus for reading data recorded on a data recording part of a film cartridge.

2. Description of Related Art

In recent years, camera conforming to a new photographic system called the Advanced Photo System have been coming in the market. The film cartridge for use with such a kind of cameras is provided with a data disk which rotates integrally with a spool shaft disposed within the film cartridge. On the data disk, there is formed a bar code representing a variety of kinds of information concerning a film contained in the film cartridge (film sensitivity, number of exposable frames, etc.).

The bar code formed on the data disk is composed of, as shown in FIG. 21, a data part (a predetermined series of groups of information) in which a "WIDE" pattern having a relatively wide width and a "NARROW" pattern having a relatively narrow width are alternately arranged in plural, and a quiet zone which indicates ends of the data part.

When the film cartridge is loaded into a cartridge chamber of the camera, a control part (not shown) of the camera causes a drive source, such as a motor, to rotate the spool disposed within the film cartridge, reads information concerning the film from the bar code on the data disk by means of a reflection-type photo-sensor mounted inside the cartridge chamber, and uses the information concerning the film for controlling the subsequent operation of the camera.

By the way, in the new photographic system, there is a standard concerning a stop position of the data disk to determine whether a usage state of the film cartridge as loaded is an "unused" state or an "exposed" state, prior to reading of the bar code information. Accordingly, prior to reading information on the bar code, it is necessary to, first, determine the usage state of the film cartridge. Hereinafter, to determine the usage state of the film cartridge is referred to as the DEP determination.

In the conventional cameras, as shown in FIG. 22, the motor is reversely rotated from a point of time t1 when the film cartridge has been loaded, and, then, the DEP determination and the reading of data disk information (bar code information) are performed. After it is confirmed that these operations have been performed normally, an operation of sending the film out of the film cartridge is performed.

As is understandable from FIG. 22, a point of t3 when an area corresponding to the quiet zone has completely passed the position of the photo-sensor is set as a reference timing, and the number of changes of the output (output pulses) of the photo-sensor occurring from the point of time t1, which is the start point of rotation of the data disk, to the point of time t3 is counted. On the basis of the thus-obtained count value, the initial stop position of the data disk is determined.

Then, the output signal of the photo-sensor obtained from the point of time t3 onward is watched, and a time interval at which the state of the output signal of the photo-sensor changes is measured by means of a timer counter or the like, whereby a discrimination between the "WIDE" pattern and the "NARROW" pattern on the data disk can be made.

In the conventional cameras having the above-described arrangement using a single photo-sensor, it is necessary to cause the data disk to make one rotation including the quiet zone, in order to read information on the data disk.

Further, at the time of reading bar code information on the data disk with the data disk rotated, it is generally necessary that the rotation of the data disk is stable. If the rotation of the data disk becomes unstable due to a mechanical disturbance, such as vibration or impact, the reliability of data reading is remarkably lowered. Thus, a code of the "NARROW" pattern may be erroneously read as a code of the "WIDE" pattern. Also, in a case where a dust or the like, which has temporarily adhered to the surface of the data disk, suddenly disappears from the surface of the data disk due to the rotation of the data disk, there is a possibility that it is impossible to read the bar code information normally.

In order to prevent such lowering of the reliability of data reading, in general, information on the data disk is made to be read a plurality of times, and a plurality of results of data reading thus obtained are compared for verification.

However, in the above-described arrangement using a single photo-sensor, the data disk is caused to make one rotation for one time of reading. When reading is performed a plurality of times in order to improve the reliability of data reading, the data disk has to be rotated a plurality of times, too. In the case of the example shown in FIG. 22, reading is performed twice. In this instance, if a result of reading for the first time differs from that for the second time, it is necessary to further continue reading, or to stop the operation on the assumption that reading is impossible.

A period of time required for reading information on the data disk, which is included in the period of time from the time when the film has been loaded into the camera to the time when the film has been transported up to a predetermined position for preparation for photography, has a length unable to be disregarded. Therefore, in the case of cameras having the above-described data disk information reading apparatus, it is preferred that the period of time required for reading information on the data disk is short.

BRIEF SUMMARY OF THE INVENTION

In accordance with one aspect of the invention, there is provided a data reading apparatus adapted for a film cartridge having a data recording part provided on a predetermined moving member, the data reading apparatus comprising a first data reading device which reads data from the data recording part, a second data reading device which reads data from the data recording part and which is disposed at a position different from that of the first data reading device with respect to a moving direction of the data recording part, and a data obtaining circuit which makes a comparison between data read by the first data reading device and data read by the second data reading device and obtains, on the basis of a result of the comparison, data corresponding to data recorded on the data recording part. In the data reading apparatus, a data reading operation on the same data recording part is performed by both the first data reading device and the second data reading device, and results of reading obtained by both the first data reading device and the second data reading device are compared with each other to determine data recorded on the data recording part.

The above and other aspects and features of the invention will become apparent from the following detailed description of preferred embodiments thereof taken in conjunction with the accompanying drawings.

BRIEF DESCRIPTION OF THE SEVERAL VIEWS OF THE DRAWING

FIG. 11 is a diagram showing the contents of memories used in a control circuit shown in FIG. 9.

FIG. 15 is a flow chart showing a series of operations of the control circuit shown in FIG. 9 including the operation during the data reading.

FIG. 16 is a diagram showing the contents of memories used in a control circuit in the fourth embodiment of the invention.

DETAILED DESCRIPTION OF THE INVENTION

Hereinafter, preferred embodiments of the invention will be described in detail with reference to the drawings.

First Embodiment

Figure 1:
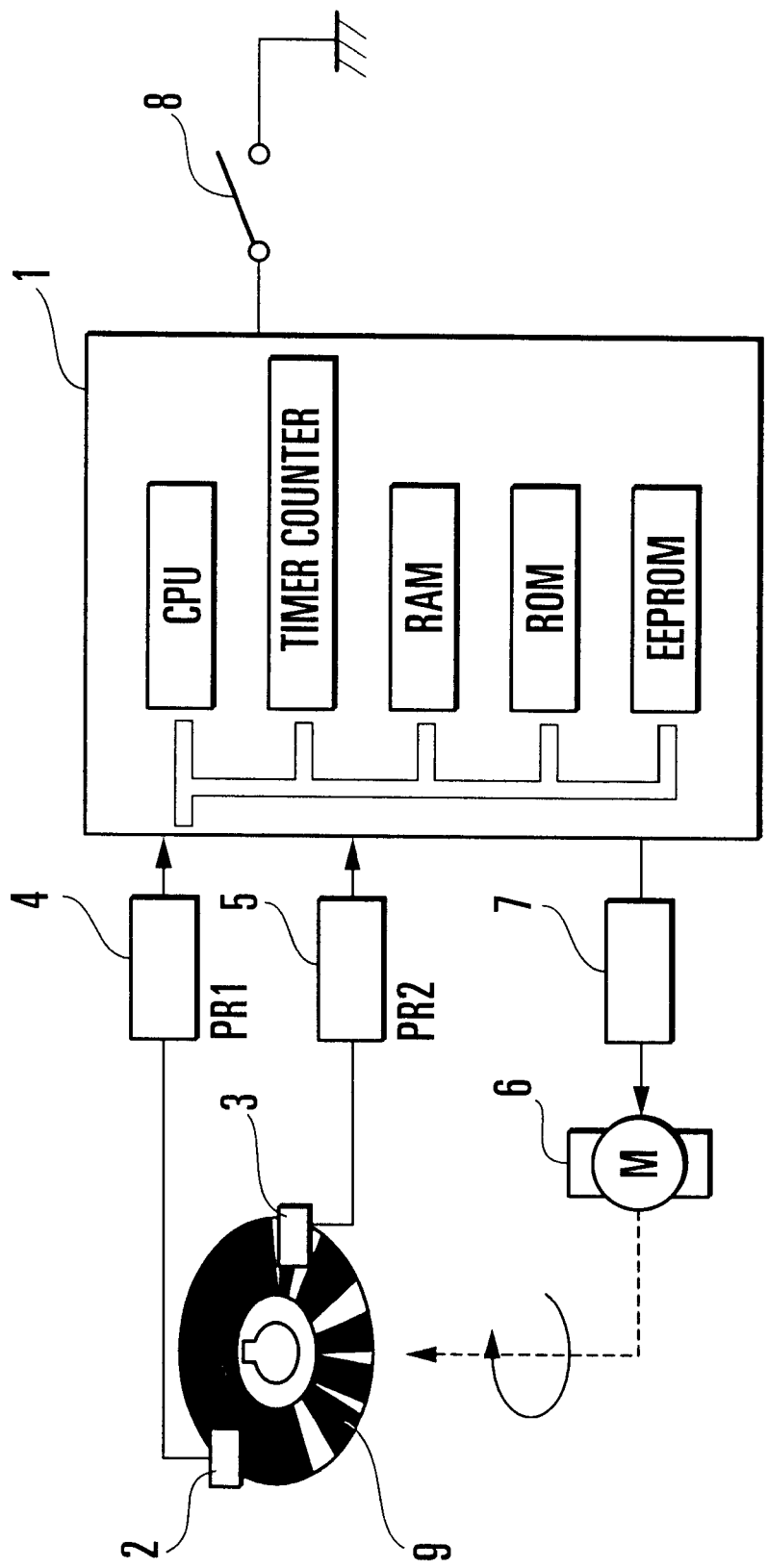
FIG. 1 is a block diagram showing in outline the arrangement of a data disk information reading apparatus according to a first embodiment of the invention.

FIG. 1 is a block diagram showing in outline the arrangement of a data disk information reading apparatus according to a first embodiment of the invention. Referring to FIG. 1, the data disk information reading apparatus includes a CPU 1 which collectively controls the whole apparatus, sensors 2 and 3, such as photo-reflectors, for optically detecting bar code patterns of a data disk 9, conversion circuits 4 and 5 which respectively convert detection signals obtained by the sensors 2 and 3 into forms recognizable by the CPU 1, a motor 6 for driving a spool shaft of the film cartridge and the data disk 9 interlocked with the spool shaft, a motor driving circuit 7, and a switch 8 which detects that the film cartridge has been loaded in the apparatus.

Further, a timer counter which is incorporated in the CPU 1 is used to measure the time in the process of rotation of the data disk, and a RAM is used to store the results of decoding of bar code patterns, etc. Also, In a ROM, there are stored programs for control and fixed data, and, in an EEPROM, there are stored a variety of parameters for adjustment, etc.

Now, when the film cartridge is loaded into the data disk information reading apparatus, the switch 8 is closed. When detecting the closing switch 8, the CPU 1 outputs a control signal to the motor driving circuit 7 to cause the motor 6 to rotate in the winding direction. Then, the rotation of the data disk 9 is detected by the sensors 2 and 3. The results of detection of the rotation of the data disk 9 are converted by the conversion circuits 4 and 5 into logic signals composed of "0" and "1", which are watched by the CPU 1. The control signal to be outputted in this instance is shown in the timing chart of FIG. 2.

Figure 2:
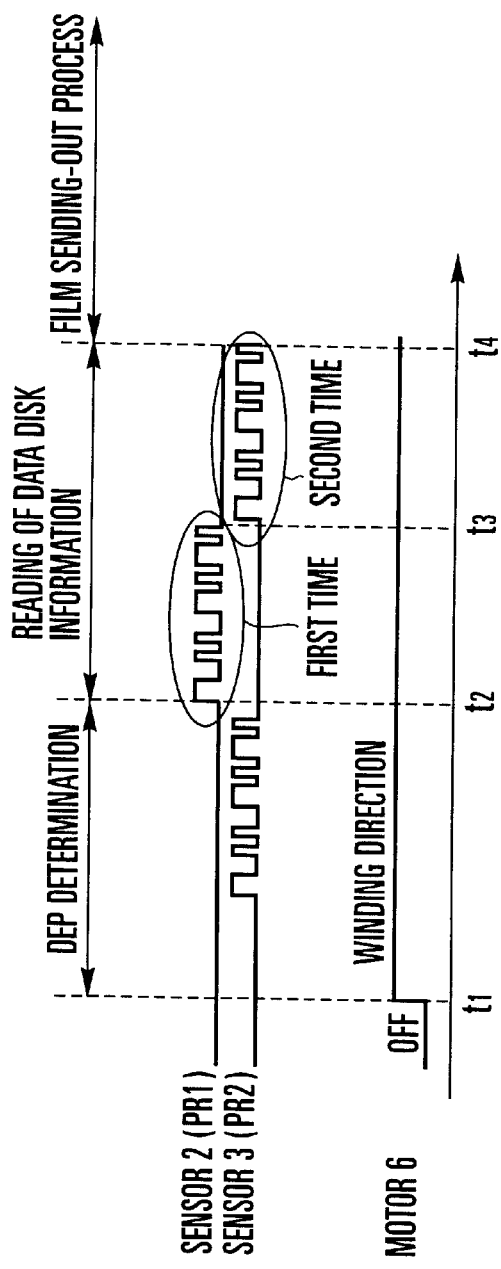
FIG. 2 is a timing chart showing a series of operations including the reading of data disk information by the data disk information reading apparatus shown in FIG. 1.
Figure 3:
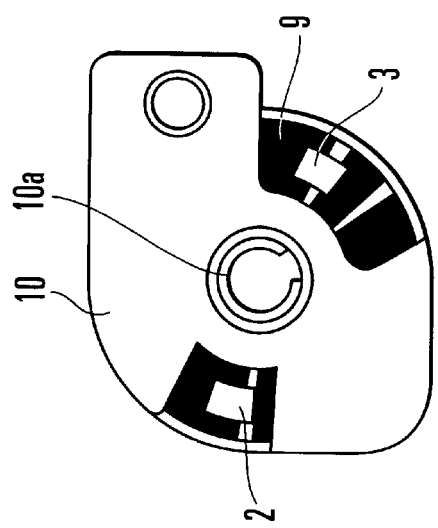
FIG. 3 is a diagram showing a relationship between a data disk provided in a film cartridge used in each of embodiments of the invention and each of sensors.
Figure 21:
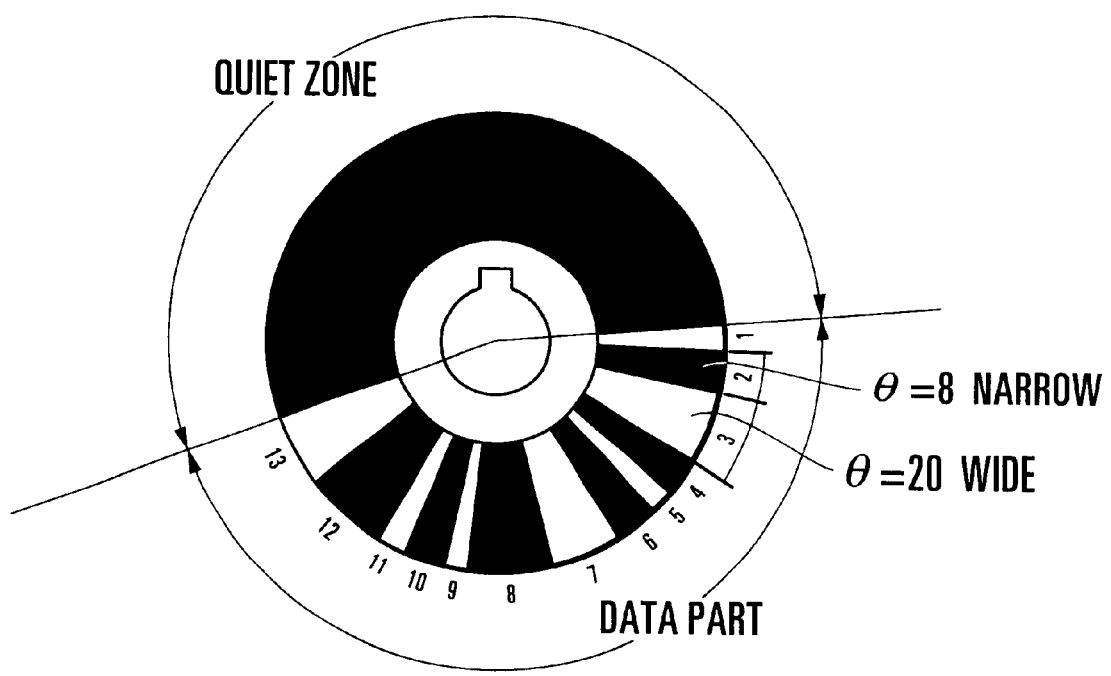
FIG. 21 is a diagram for explaining bar code information on a data disk provided in a usual film cartridge.

Referring to FIG. 2, after a point of time t1 when the motor 6 starts to be energized, signals PR1 and PR2 are outputted from the sensors 2 and 3 in accordance with changes of state of the bar code (bright and dark patterns). More specifically, as shown in FIG. 3, the sensors 2 and 3 are disposed approximately in opposite positions across a spool shaft 10a of the film cartridge 10, and the data disk 9 is provided with the data part which extends over an angle of less than 180 degrees as described in the foregoing with reference to FIG. 21. Therefore, signals of "0" and "1" in the data part are alternately obtained from each of the sensors 2 and 3.

Figure 22:
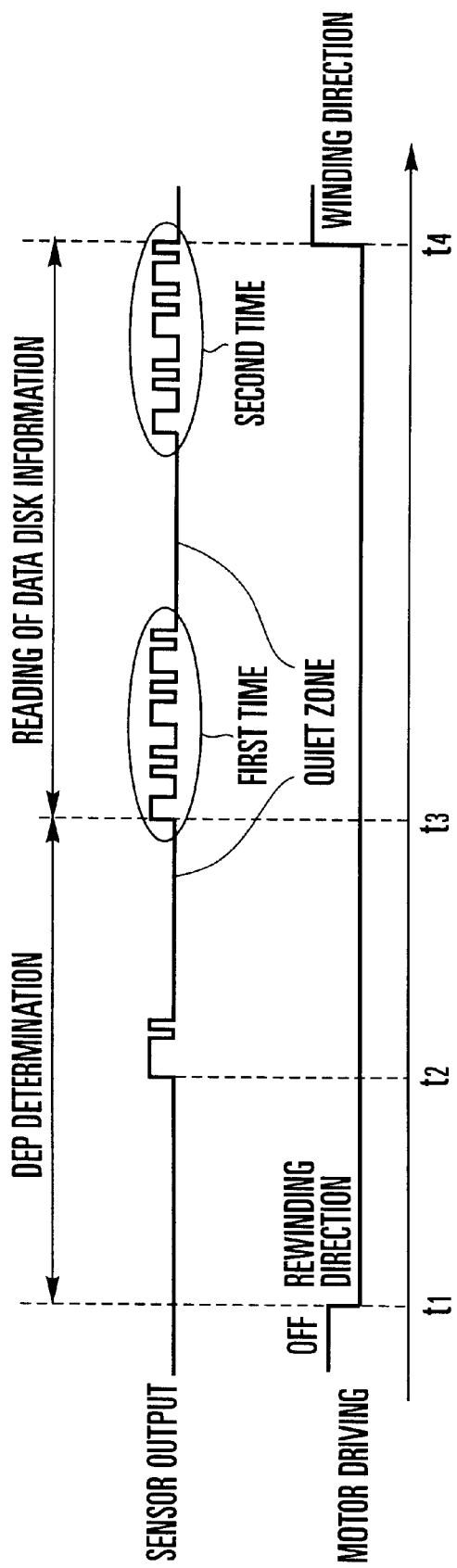
FIG. 22 is a timing chart showing a series of operations including the reading of data disk information by a conventional data disk information reading apparatus.

Although in the conventional arrangement the DEP determination is completed upon detection of the quiet zone (see FIG. 22), in the case of FIG. 2, the DEP determination is completed at a point of time t2. More specifically, since it is apparent that the fore end (or the last end) of the data part appears at the point of time t2 when the signal PR1 of the sensor 2 changes for the first time after the signal of the PR2 of the sensor 3 changes, the initial stop position of the data disk 9 can be determined on the basis of the number of changes of the signal PR1 or PR2 occurring during the interval from the energizing-start point of time t1 to the point of time t2.

Subsequently, the timer counter incorporated in the CPU 1 is made to operate in accordance with changes of the signal PR1 of the sensor 2 so as to measure the time, i.e., the angle, corresponding to each pattern of the bar code of the data part on the data disk 9. Upon measurement up to a point of time t3, the measuring operation on the whole data part is completed, so that a bar code measuring result for the first time is obtained. Next, since the signal PR2 on the data part appears at the sensor 3 this time, the timer counter is again made to operate in accordance with changes of the signal PR2 of the sensor 3 so as to measure the time, i.e., the angle, corresponding to each pattern of the bar code of the data part on the data disk 9. Upon measurement up to a point of time t4, the measuring operation on the whole data part is completed, so that a bar code measuring result for the second time is obtained.

Then, the bar code measuring results for the first time and the second time are compared with each other. If it is found that the bar code measuring results for the first time and the second time coincide with each other, the reliability of data reading is regarded as having no problem, so that a control operation for sending out the film is started. The control operation for sending out the film has no direct relation with the invention, and is, therefore, omitted from the description here.

Figure 4:
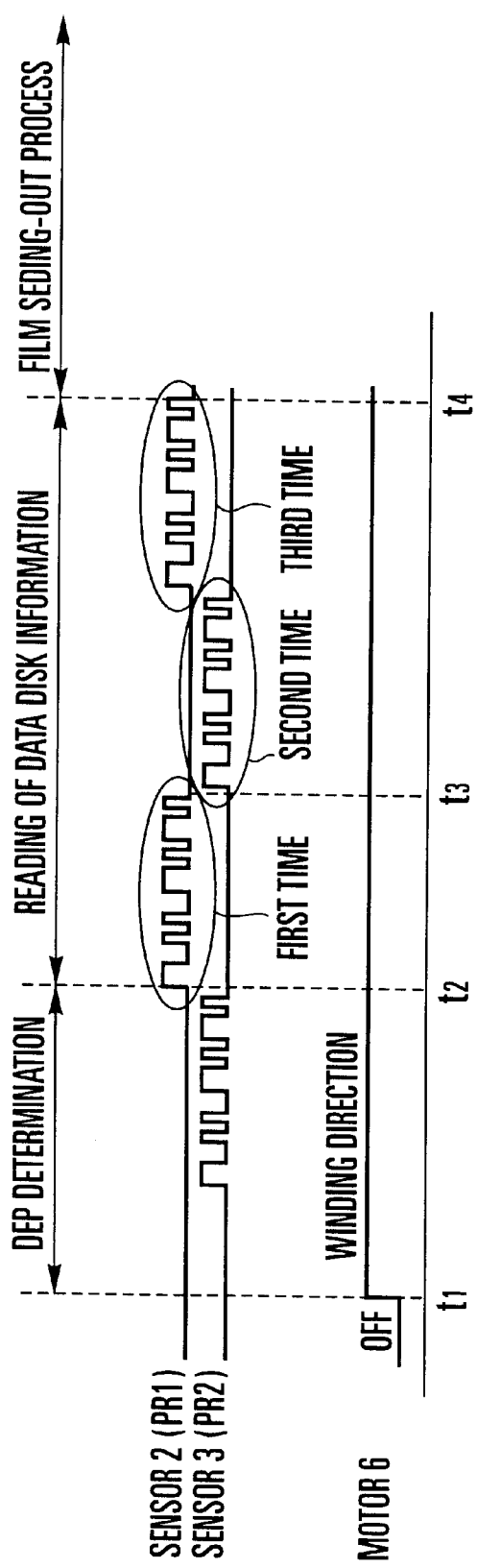
FIG. 4 is a timing chart showing a series of operations to be performed for the purpose of improving the reading accuracy of data disk information in the data disk information reading apparatus shown in FIG. 1.
Figure 5:
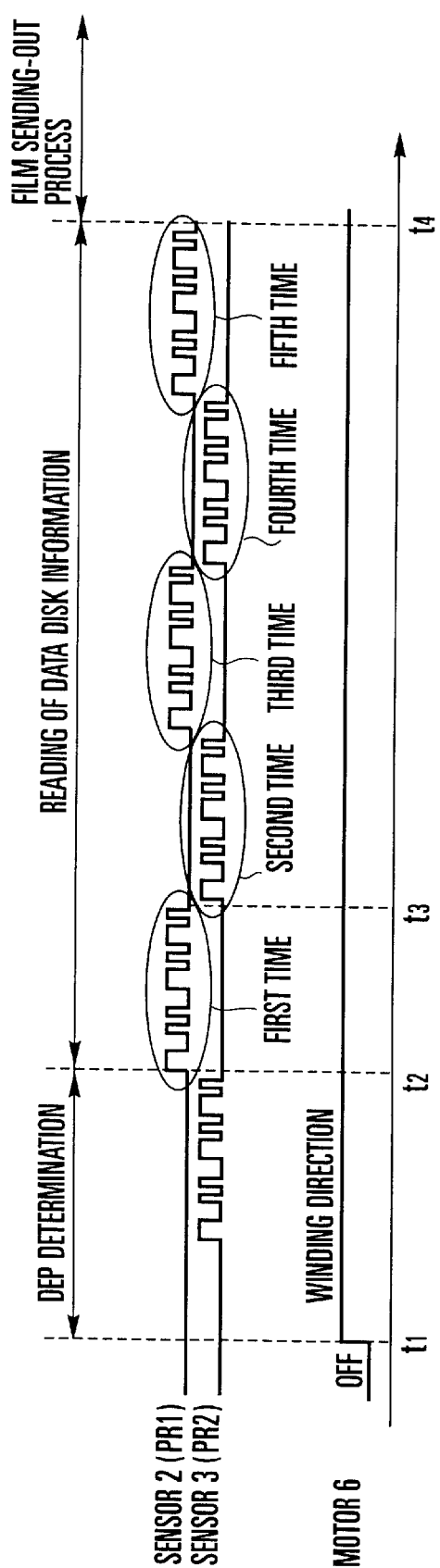
FIG. 5 is a timing chart showing a series of operations to be performed for the purpose of further improving the reading accuracy of data disk information in the data disk information reading apparatus shown in FIG. 1.

Should the bar code measuring results for the first time and the second time do not coincide with each other due to a mechanical disturbance or the like, the signal PR2 may be further measured to perform a reading operation for the third time, as shown in FIG. 4. Then, the bar code measuring result for the third time is compared with the bar code measuring result for the first time or the second time, and a measuring result indicating the higher reliability of data reading is adopted. In order to enhance the reliability of data reading, a further number of reading operations, as for the fourth time, the fifth time and so on, may be performed as shown in FIG. 5.

As described above, in the data disk information reading apparatus having the system of reading bar code information on the data disk 9 in the film winding direction, there are provided two sensors, which are used to alternately read the bar code information. Accordingly, there can be obtained information having the amount two times the amount of information obtainable in the conventional arrangement per the same amount of rotation of the data disk 9. Thus, information on the data disk can be read for a short period of time. Therefore, it is possible to eliminate such inconveniences that the film happens to pass over the predetermined initial exposable position, or that a comparison for verification of the data disk information read a plurality of times is not yet completed at a point of time when the film is stopped at the initial exposable position, and there is not obtained important information such as film sensitivity information.

Further, even in a case where a reading error occurs due to the uneven rotation of the data disk or the like, a plurality of times of re-reading operations can be performed for a short period of time, and, therefore, the reliability of data reading can be improved.

Further, in the case of the system of reading information on the data disk in the film winding direction, a plurality of times of comparisons for verification of data can be performed for a short period of time. Therefore, even in a case where a reading error occurs due to a mechanical disturbance, a re-reading operation can be performed a further number of times.

Further, since a reading operation on the data disk is completed for a short period of time, it is possible to shorten the time required from the loading of the film cartridge to the exposure-ready state, so that there is provided a camera excellent in operability and available for shutter opportunity.

Second Embodiment

Figure 6:
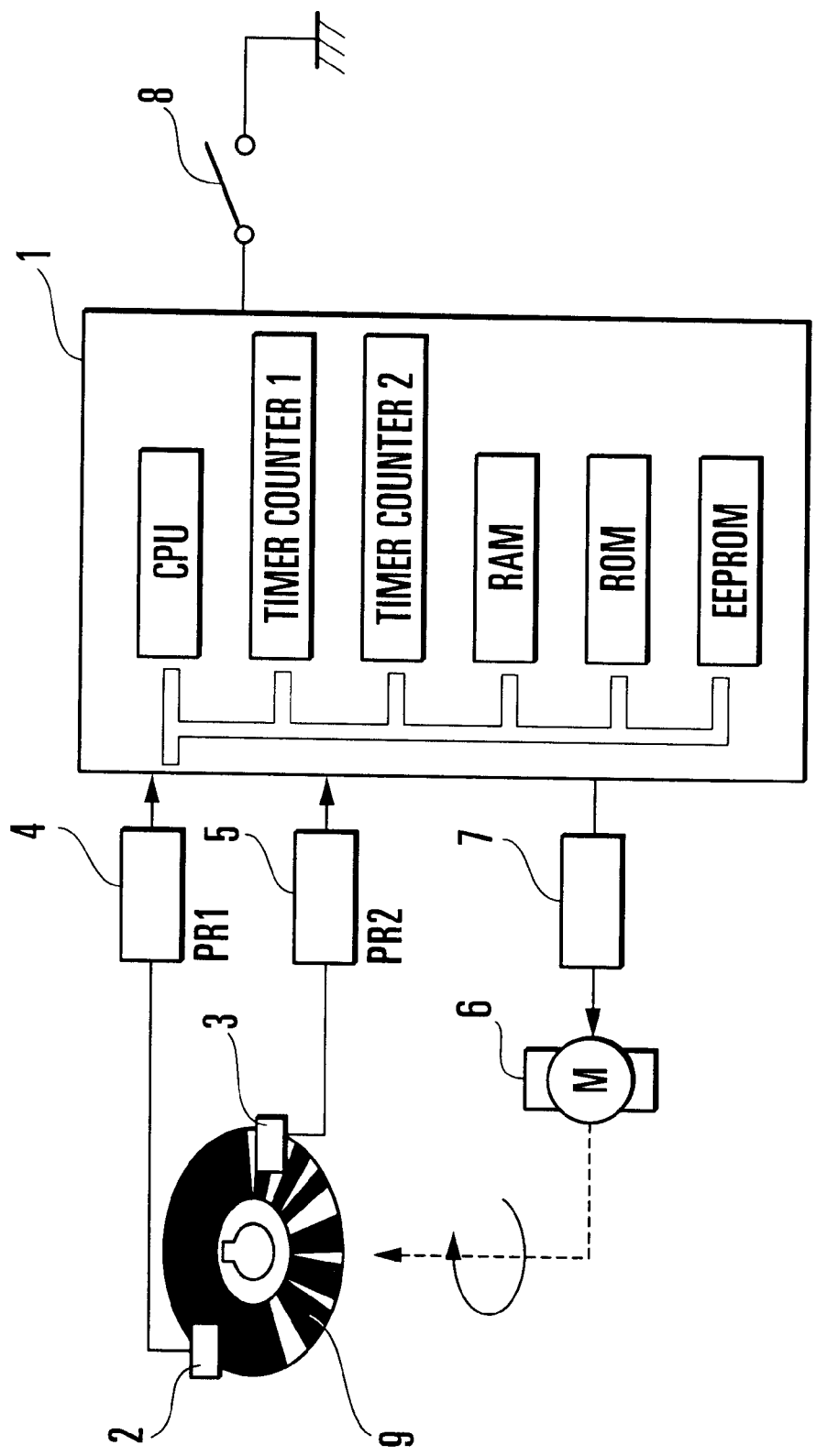
FIG. 6 is a block diagram showing in outline the arrangement of a data disk information reading apparatus according to a second embodiment of the invention.

In the above-described first embodiment, there is provided only one timer counter used for measuring the time concerning the bar code. In the circuit arrangement according to a second embodiment of the invention, separate timer counters TC1 and TC2 are respectively assigned for the signals PR1 and PR2 of the sensors 2 and 3, as shown in FIG. 6.

Figure 7:
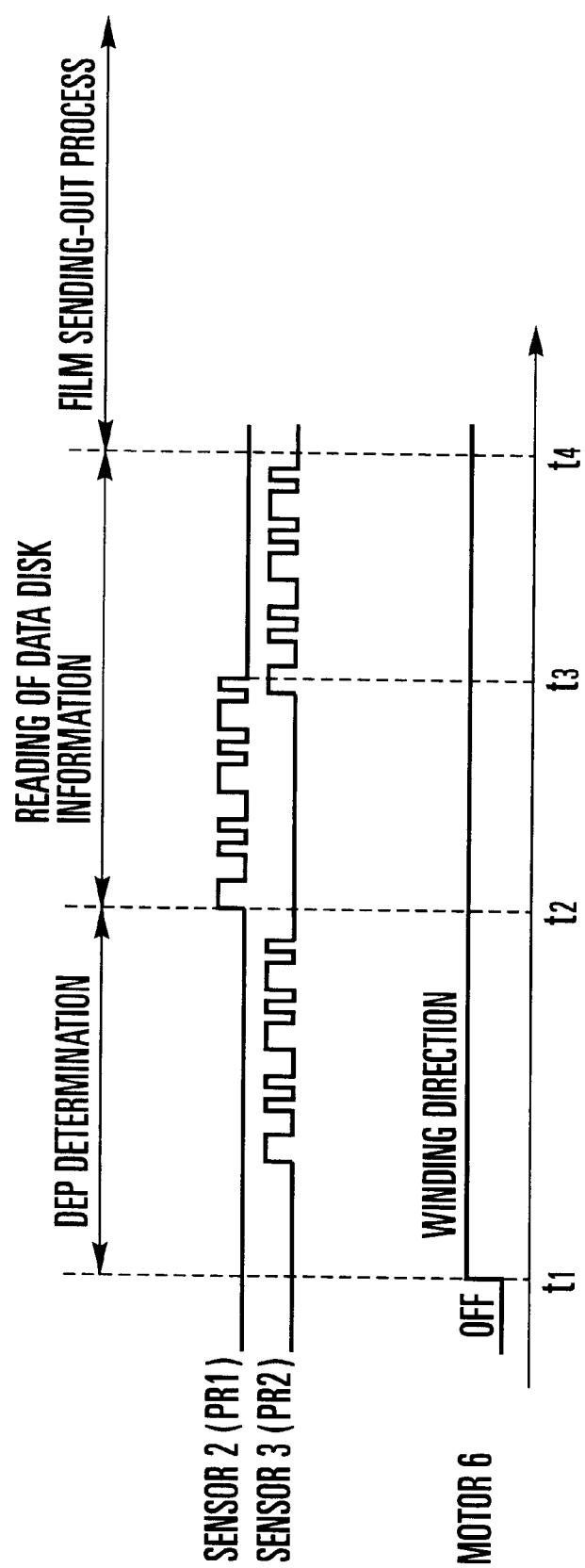
FIG. 7 is a timing chart showing a series of operations including the reading of data disk information by the data disk information reading apparatus shown in FIG. 6.

The circuit arrangement according to the second embodiment of the invention as described above has, in addition to the advantageous effect described in the first embodiment, such an advantageous effect that, even if changes of state of the signals PR1 and PR2 overlap with each other, as shown in FIG. 7, due to the unevenness of the mounting positions of the sensors 2 and 3, it is possible to unerringly indicate the start and end of measurement of the timer counters.

Third Embodiment

Figure 8:
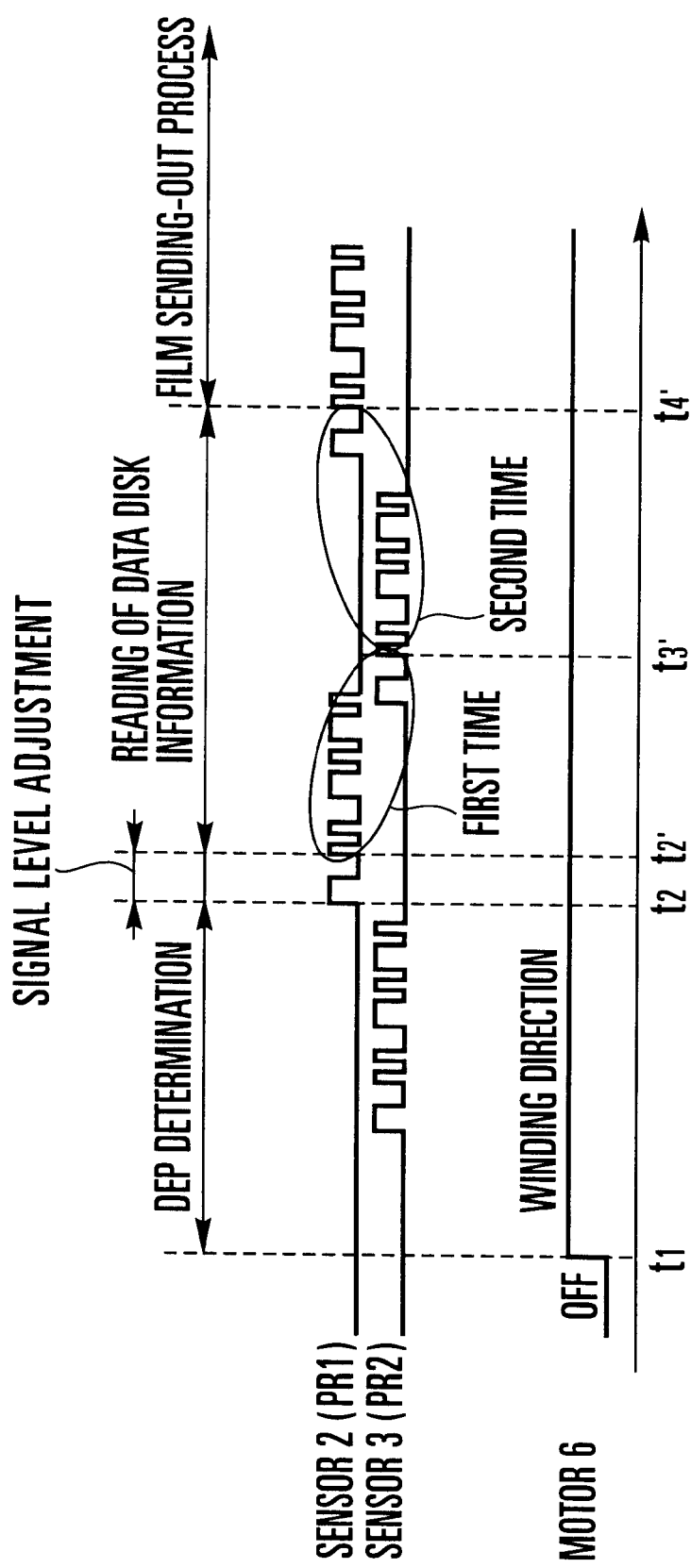
FIG. 8 is a timing chart showing a series of operations including the reading of data disk information by a data disk information reading apparatus according to a third embodiment of the invention.

In the above-described first embodiment, the DEP determination is completed at the point of time t2 shown in FIG. 2. However, in a case where such an arrangement that the levels of the output signals PR1 and PR2 of the sensors 2 and 3 are adjusted during the process of the DEP determination is adopted, the DEP determination is made to be completed at a point of time t2' which is a little later than the point of time t2, as shown in FIG. 8.

Even in such a case, according to a third embodiment of the invention, the timer counter is made to operate in accordance with changes of the signals PR1 and PR2 so as to measure the time, i.e., the angle, corresponding to each pattern of the bar code of the data part on the data disk 9. Upon measurement up to a point of time t3', a bar code measuring result for the first time (a predetermined series of groups of information (in this example, 13 changes caused by bright and dark patterns)) can be obtained. Similarly, upon measurement up to a point of time t4', a bar code measuring result for the second time can be obtained.

More specifically, in the case of the example shown in FIG. 8, since the signal PR1 obtained by the sensor 2 is insufficient for a predetermined series of groups of information, a part (in this example, two changes caused by bright and dark patterns) of the signal PR2 obtained by the sensor 3, which is used to read information subsequently, is supplemented to the signal PR1, so that a series of groups of information (bar code measuring result) for the first time is complemented. Also, since the signal PR2 obtained by the sensor 3 is insufficient for a predetermined series of groups of information, a part (in this example, two changes caused by bright and dark patterns) of the signal PR1 obtained by the sensor 2, which is used to read information subsequently, is supplemented to the signal PR2, so that a series of groups of information (bar code measuring result) for the second time is complemented.

Then, the bar code measuring results for the first time and the second time are compared with each other. If it is found that the bar code measuring results for the first time and the second time coincide with each other, the reliability of data reading is regarded as having no problem, so that a control operation for sending out the film is started.

As described above, the data disk information reading apparatus has such an arrangement that, no matter where the timing for starting the reading of the data disk is located, bar code information on the data disk can be read by two sensors alternately. Accordingly, there can be obtained information having the amount two times the amount of information obtainable in the conventional arrangement per the same amount of rotation of the data disk. Thus, information on the data disk can be read for a short period of time.

Further, even in a case where a reading error occurs due to the uneven rotation of the data disk or the like, a plurality of times of re-reading operations can be performed for a short period of time, and, therefore, the reliability of data reading can be improved.

In addition, in the cases of the first to third embodiments, the motor is driven in the film winding direction. However, even if the motor is driven in the film rewinding direction, the same advantageous effect of shortening the reading time for the data disk can be obtained. Thus, the invention is of course applicable also to the system in which the reading of data disk information is performed while the motor is being driven in the film rewinding direction.

As has been described above, according to each of the first to third embodiments, in the system in which data disk information is read while the data disk is being rotated in the film winding direction, the data disk information reading apparatus is able to surely read the data disk information before the film reaches the predetermined initial exposable position.

Further, according to each of the first to third embodiments, the data disk information reading apparatus is able to surely read the data disk information for a short period and with high reliability, no matter where the timing for starting the reading of the data disk information is located.

Fourth Embodiment

First, such an arrangement as to serve as a premise of an apparatus according to a fourth embodiment of the invention will be described.

In general, a first photo-sensor PIDDC composed god of a pair of a light emitting element and a light receiving element and a second photo-sensor PIDDA having the same composition as the first photo-sensor PIDDC are used for reading data from a data disk provided on a film cartridge. Specifically, the photo-sensor PIDDC is used for data reading and the photo-sensor PIDDA is used for preparing the timing for data reading.

Further, for the purpose of enhancing the reliability of data as read, data is made to be read twice by using the photo-sensor PIDDC, and data read for the first time and data read for the second time are compared with each other.

Figure 9:
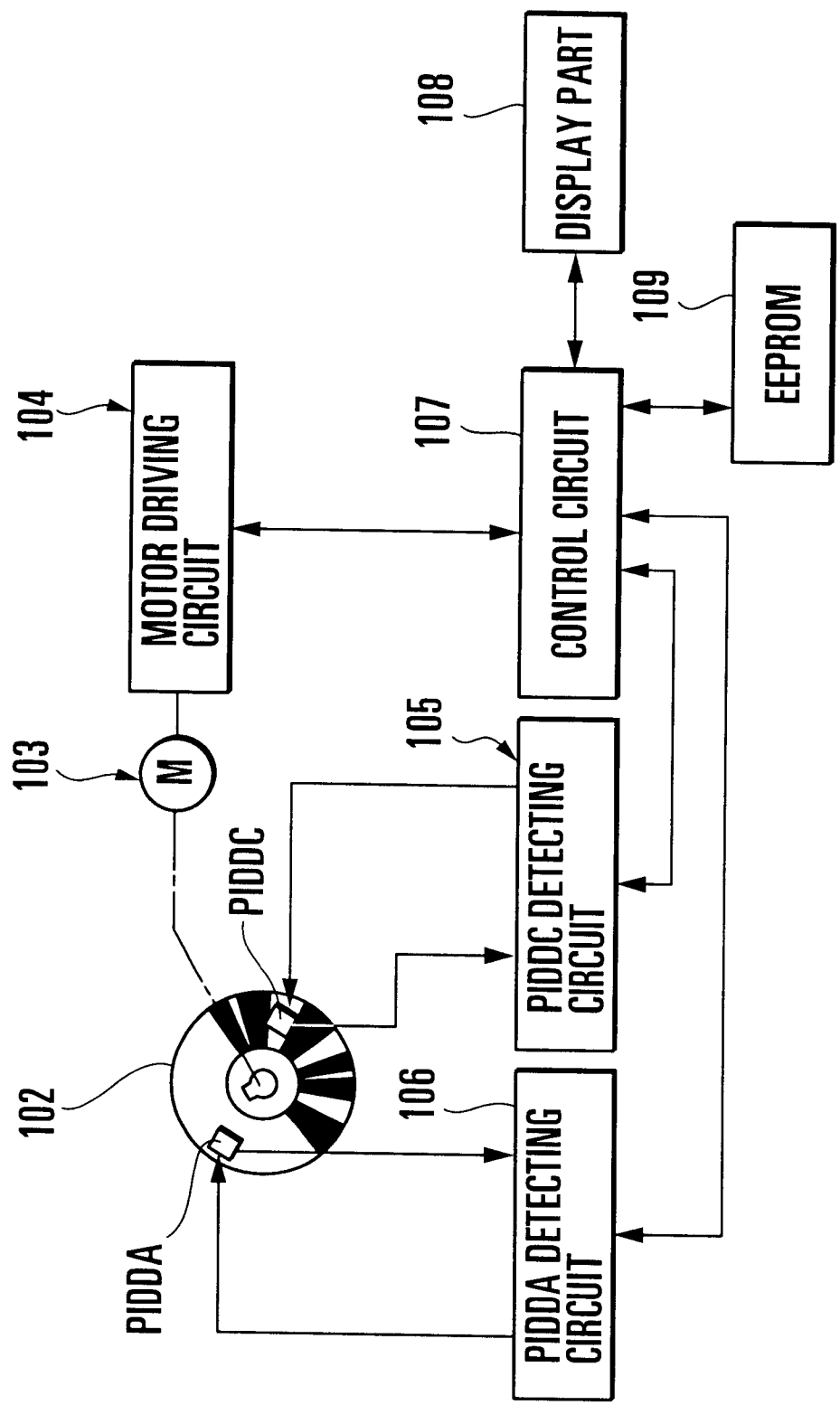
FIG. 9 is a block diagram showing the arrangement of a data disk reading apparatus for reading data from a data disk, which is an apparatus serving as a premise of a fourth embodiment of the invention.

FIG. 9 is a block diagram showing the arrangement of a data disk reading apparatus for reading data from a data disk.

Referring to FIG. 9, each of the photo-sensors PIDDC and PIDDA is a reflection-type photo-sensor composed of a light-emitting element and a light-receiving element, as described above, to convert bright and dark patterns of a data disk 102 into an electrical signal. The data disk 102 is a disk provided on the film cartridge, in which data, such as the number of film frames, ISO (film sensitivity), the kind of film, etc., is recorded with bright and dark patterns.

Figure 10A:
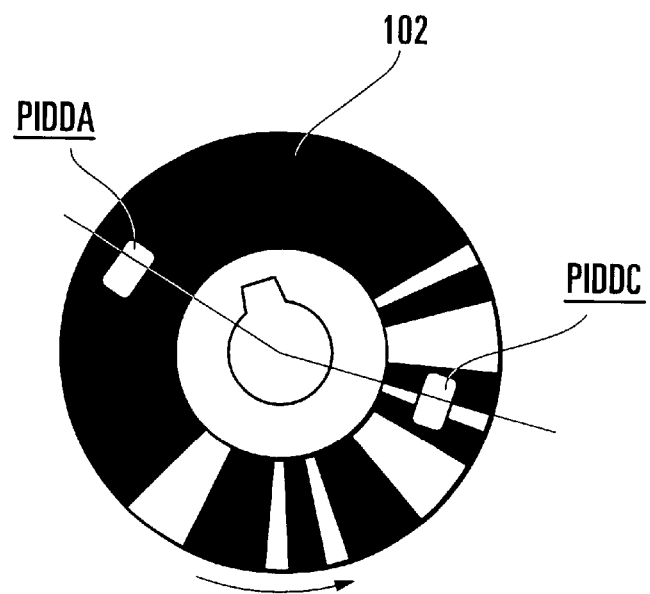
FIGS. 10A and 10B are respectively an enlarged view of the data disk and a timing chart showing outputs of photosensors PIDDC and PIDDA.
Figure 10B:
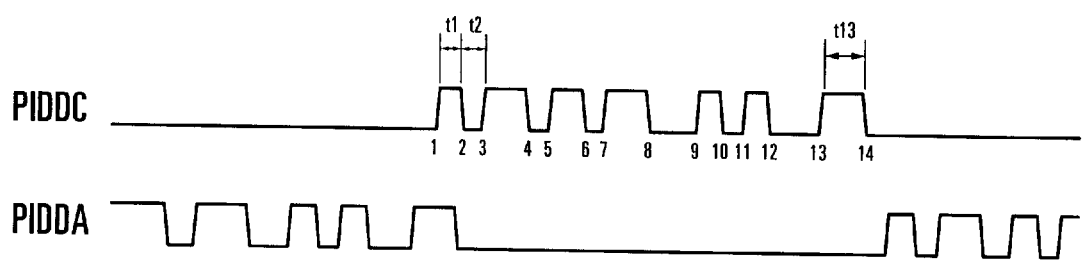

FIGS. 10A and 10B are respectively an enlarged view of the data disk 102 and a timing chart showing outputs of the photo-sensors PIDDC and PIDDA. As understandable from FIGS. 10A and 10B, bright patterns are formed at seven places on the data disk 102. The photo-sensor PIDDC reads the pattern of the data disk 102 to output a signal. Upon receiving the signal, a control circuit, which will be described later, counts changes "1" to "13" of the edge of the signal and takes in an interval between each edge and the subsequent edge as time data t1 to t13. Then, the control circuit converts the time data into element code data (ELC: 3 bits) indicative of the number of film frames, graphic character data (GC1: 5 bits) indicative of ISO information, and graphic character data (GC2: 5 bits) indicative of the kind of film.

Referring back to FIG. 9, a motor 103 is arranged to rotate the data disk 102, which is interlocked with the film supply spool of the film cartridge. A motor driving circuit 104, which is arranged to drive the motor 103, is controlled by the control circuit in such a way as to cause the data disk 102 to rotate at a constant speed and to enable the bright and dark patterns to be taken in as time data through the photo-sensors PIDDC and PIDDA. A PIDDC detecting circuit 105 includes a circuit part for converting an analog signal outputted from the photo-sensor PIDDC into a digital signal, a circuit part for setting the light-receiving detection level used for converting the analog signal into the digital signal, and a circuit part for setting the light-emission level of the light emitting element of the photo-sensor PIDDC. A PIDDA detecting circuit 106 includes a circuit part for converting an analog signal outputted from the photo-sensor PIDDA into a digital signal, a circuit part for setting the light-receiving detection level used for converting the analog signal into the digital signal, and a circuit part for setting the light-emission level of the light emitting element of the photo-sensor PIDDA.

The control circuit, which is denoted by reference numeral 107, includes a circuit part for measuring each pulse time width of the digital signals outputted from the PIDDC detecting circuit 105 and the PIDDA detecting circuit 106, a circuit part for converting the pulse time widths into data ELC, GC1 AND GC2, and a circuit part for making a comparison between new data and old data for verification. A display part 108 is arranged to display any error in taking in data. An EEPROM 109 stores therein the light-receiving detection level, the light-emission level, etc., which are to be set in the PIDDC detecting circuit 105 and the PIDDA detecting circuit 106.

FIG. 11 is a diagram showing memories (including counters) which store therein data to be used in the control circuit 107.

Referring to FIG. 11, a memory "a" stores the light-receiving detection level used for converting an analog output of the light receiving element of the photo-sensor PIDDC into a digital output, a memory "b" stores the light-receiving detection level used for converting an analog output of the light receiving element of the photo-sensor PIDDA into a digital output, a memory "c" stores the light-emission level of the light receiving element of the photo-sensor PIDDC, and a memory a "d" stores the light-emission level of the light receiving element of the photo-sensor PIDDA. The above various data are stored in the memories "a" to "d" by reading values set in the EEPROM 109.

A memory "e" stores pulse width time data (t1 to t13 for one rotation: 13 areas) read from the data disk 102 by the photo-sensor PIDDC, a memory "f" stores the newest value (DDC_ELC_NEW) of numerical data indicative of the number of film frames (3 bits) found from the pulse width time data obtained from the output of the photo-sensor PIDDC, a memory "g" stores the newest value (DDC_GC1_NEW) of numerical data (5 bits) found from the pulse width time data obtained from the output of the photo-sensor PIDDC, a memory "h" stores the newest value (DDC_GC2_NEW) of numerical data (5 bits) found from the pulse width time data obtained from the output of the photo-sensor PIDDC, a memory "i" stores the immediately-older value (DDC-ELC-OLD) of numerical data indicative of the number of film frames (3 bits) found from the pulse width time data obtained from the output of the photo-sensor PIDDC, a memory "j" stores the immediately-older value (DDC_GC1_OLD) of numerical data (5 bits) found from the pulse width time data obtained from the output of the photo-sensor PIDDC, and a memory "k" stores the immediately-older value (DDC_GC2_OLD) of numerical data (5 bits) found from the pulse width time data obtained from the output of the photo-sensor PIDDC.

A PIDDC edge counter "1" is arranged to count, as a count value (PIDDC_EC), the number of changes of the output pulse signal of the photo-sensor PIDDC, and a PIDDA edge counter "m" is arranged to count, as a count value (PIDDA_EC), the number of changes of the output pulse signal of the photo-sensor PIDDA.

Figure 12A:
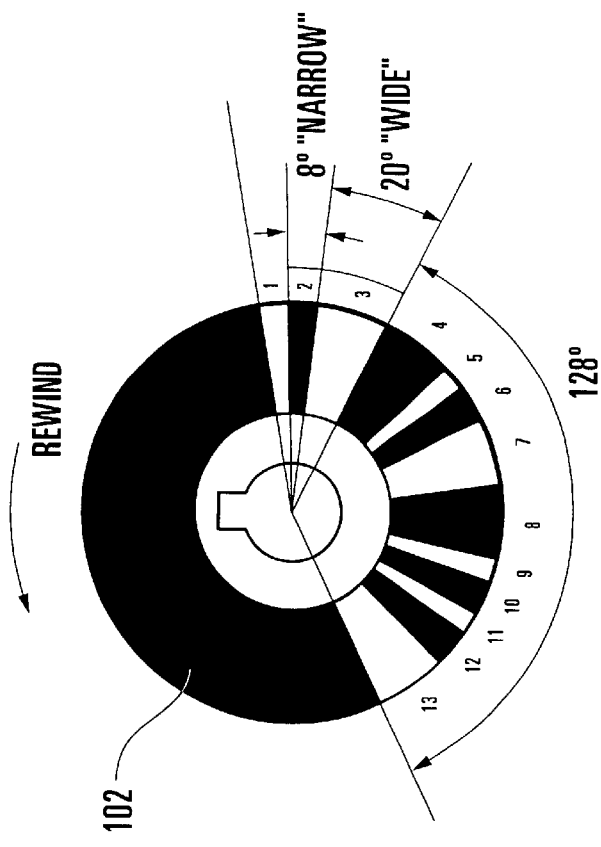
FIGS. 12A and 12B are diagrams for explaining the method of converting data read from the data disk into data ELC, GC1 and GC2.
Figure 12B:
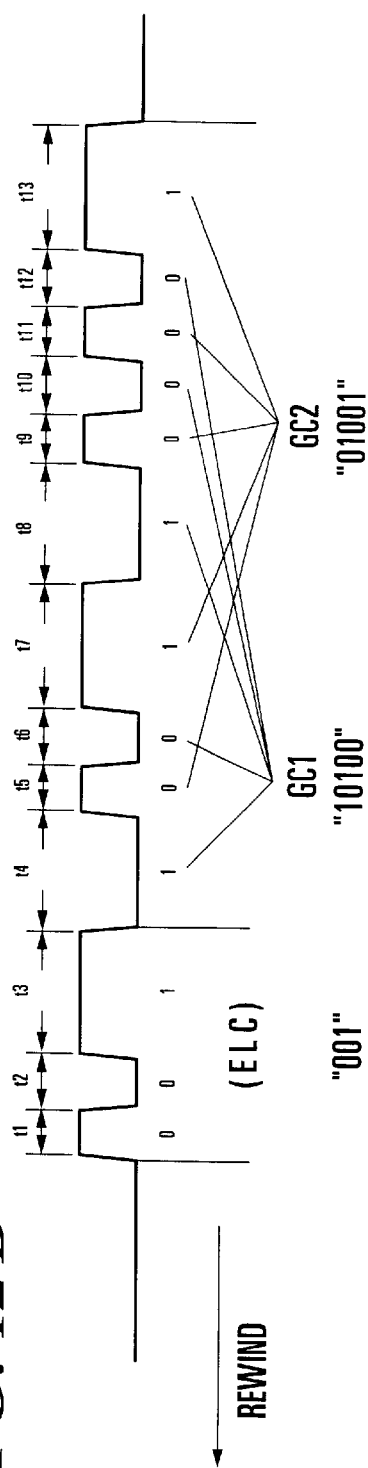

FIGS. 12A and 12B are diagrams for explaining the method of converting data read from the data disk 102 into data ELC, GC1 AND GC2.

Since, in general, reading of data is performed while rotating the data disk in the "REWIND" direction (the film rewinding direction)(although it is possible to perform reading of data while rotating the data disk in the opposite direction), an explanation will be made here about the case where the data disk is rotated in the "REWIND" direction.

As shown in FIG. 12A, bright patterns are formed at seven places on the data disk 102, and there are dark patterns at six places each of which is sandwiched by two adjacent bright patterns. Thus, pulse widths at thirteen places in all are obtained on the data disk 102 to represent thirteen data. Among the thirteen data, the first three data represent data ELC (element code) and the remaining ten data are divided into a set of five data for dark patterns and a set of five data for bright patterns. Data GC1 (information on ISO) and data GC2 (information on the kind of film) are represented by the combination of the set of five data for dark patterns and the set of five data for bright patterns. Each of data for dark patterns and data for bright patterns in the above ten data is composed of two "WIDE" patterns (20 degrees per one data) and three "NARROW" patterns (8 degrees per one data). The total of widths of the above ten data is always a fixed value of 128 degrees. Accordingly, a time value equivalent to 14 degrees is found from the time corresponding to the total of pulse widths for ten data obtained by excluding the first three data from thirteen data. The thus-found time value is set as a threshold value to treat (determine) the "WIDE" pattern as "data =1" and the "NARROW" pattern as "data= 0".

After the determination of data as to "1" or "0" is performed, data on the data disk 2 is stored while being divided into data ELC, GC1 AND GC2. Each of the data GC1 and GC2 has parity data, and the total number of patterns of "data=1" (WIDE) in each of the data GC1 and GC2 is "2".

The reading of data is performed twice in general. Then, the old data read for the first time (ELC_OLD, GC1_OLD and GC2_OLD) and the newest data read for the second time (ELC_NEW, GC1_NEW and GC2_NEW) are compared with each other. After it is confirmed that the old data and the newest data are identical to each other, parity data of each of the data GC1 and GC2 is checked.

Specifically, during the time when the data disk 102 makes two rotations, the reading of data on the data disk 102 is performed twice by means of the photo-sensor PIDDC. Then, two data thus obtained are compared with each other for checking, so as to evaluate the reliability of data.

Figure 13:
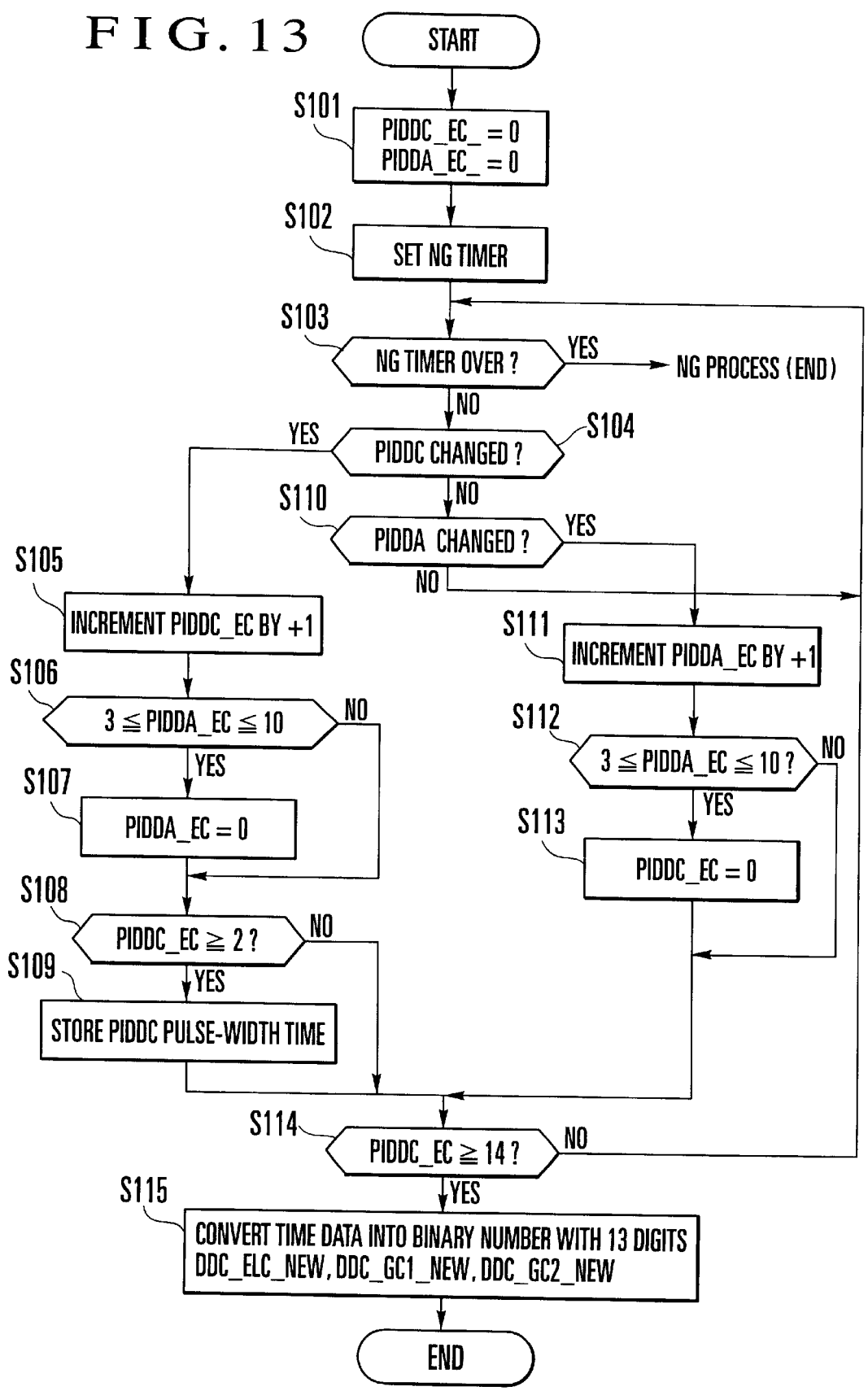
FIG. 13 is a flow chart showing the operation of the control circuit shown in FIG. 9 during the data reading.

The operation of the control circuit shown in FIG. 9 during the data reading will be described with reference to the flow chart of FIG. 13.

First, in step S101, prior to performing the data reading, a count value PIDDC_EC (the value of the PIDDC edge counter) and a count value PIDDA_EC (the value of the PIDDA edge counter) are initialized. In the next step S102, an NG timer, which is provided for terminating the present sequence when it is impossible to take in output signals, is set. Then, in step S103, a check is made to find if the time set at the NG timer has been up. If so, the flow is brought to an end as the process is N.G.

If the time set at the NG timer has not yet been up, the flow proceeds to step S104. In step S104, a check is made to find if the output of the photo-sensor PIDDC has changed. If so, the flow proceeds to step S105. In step S105, the count value PIDDC_EC is incremented by one to continue counting. Then, in step S106, a check is made to find if the count value PIDDC_EC satisfies a condition of "3≦PIDDC_EC≦10". If not, the flow proceeds to step S108. If, so, the flow proceeds to step S107. In step S107, the count value PIDDA_EC is set to "PIDDA_EC=0" to clear the PIDDA edge counter. Then, since the PIDDA edge counter has been cleared as "PIDDA_EC=0", when data (pulse) is read by the photo-sensor PIDDA for the next time, the counting operation from "1" is again started.

Incidentally, the reason why the PIDDA edge counter is not made to be cleared on the condition of "1≦PIDDC_EC≦14" is as follows. There is a possibility that the first one pulse of one of the output signal of the photo-sensor PIDDA and the output signal of the photo-sensor PIDDC and the last one pulse of the other overlap each other temporally. Therefore, if the count value PIDDA_EC is made to be cleared on condition that a change has occurred in the output of the photo-sensor PIDDC, there is a possibility that it is impossible to count the first pulse or last pulse of the photo-sensor PIDDA.

In the next step S108, a check is made to find if the count value PIDDC_EC satisfies a condition of "PIDDC_EC≦2". If so, the flow proceeds to step S109. In step S109, pulse width time data (a difference between the time of an edge n+1 and the time of an edge n) is stored in the PIDDC pulse width time memory. Further, in the case of "PIDDC edge counter=1", there exists no pulse width, so that, with the step S109 canceled, the flow immediately proceeds to step S114.

In a case where the output of the photo-sensor PIDDC has not changed in the above step S104, the flow proceeds to step. S110. In step S110, a check is made to find if the output of the photo-sensor PIDDA has changed. If not, the flow returns to step S103. If so, the flow proceeds to step Sill. In step Sill, the count value PIDDA_EC is incremented by one to continue counting. Then, in step S112, a check is made to find if the count value PIDDA_EC satisfies a condition of "3≦PIDDA_EC≦10". If not, the flow proceeds to step S114. If, so, the flow proceeds to step S113. In step S113, the count value PIDDC_EC is set to "PIDDC_EC=0" to clear the PIDDC edge counter. Then, since the PIDDC edge counter has been cleared as "PIDDC_EC=0", when data (pulse) is read by the photo-sensor PIDDC for the next time, the counting operation from "1" is again started.

Incidentally, the reason why the PIDDC edge counter is not made to be cleared on the condition of "1≦PIDDA_EC≦14" is as follows. There is a possibility that the first one pulse of one of the output signal of the photo-sensor PIDDA and the output signal of the photo-sensor PIDDC and the last one pulse of the other overlap each other temporally. Therefore, if the count value PIDDC_EC is made to be cleared on condition that a change has occurred in the output of the photo-sensor PIDDA, there is a possibility that it is impossible to count the first pulse or last pulse of the photo-sensor PIDDC.

In step S114, a check is made to find if the value of the PIDDC edge counter satisfies a condition of "PIDDC_EC≦14". If not, the flow returns to step S103, thereafter repeating the above-described operation. If so, the flow proceeds to step S115 as the data taking-in operation of the photo-sensor PIDDC has been completed. In step S115, the values of the PIDDC pulse width time memory are converted into numerical data in accordance with pulse width time lengths. In other words, the values of the PIDDC pulse width time memory are stored as data DDC_ELC_NEW, DDC_GC1_NEW and DDC_GC2_NEW.

According to the above-described method, data for one time is read upon one rotation of the data disk 102. Then, the same reading is performed again. The control circuit 107 compares data for the first time and data for the second time with each other, and makes a parity check for each data, thereby determining whether the data reading is O.K. or N.G.

Figure 14:
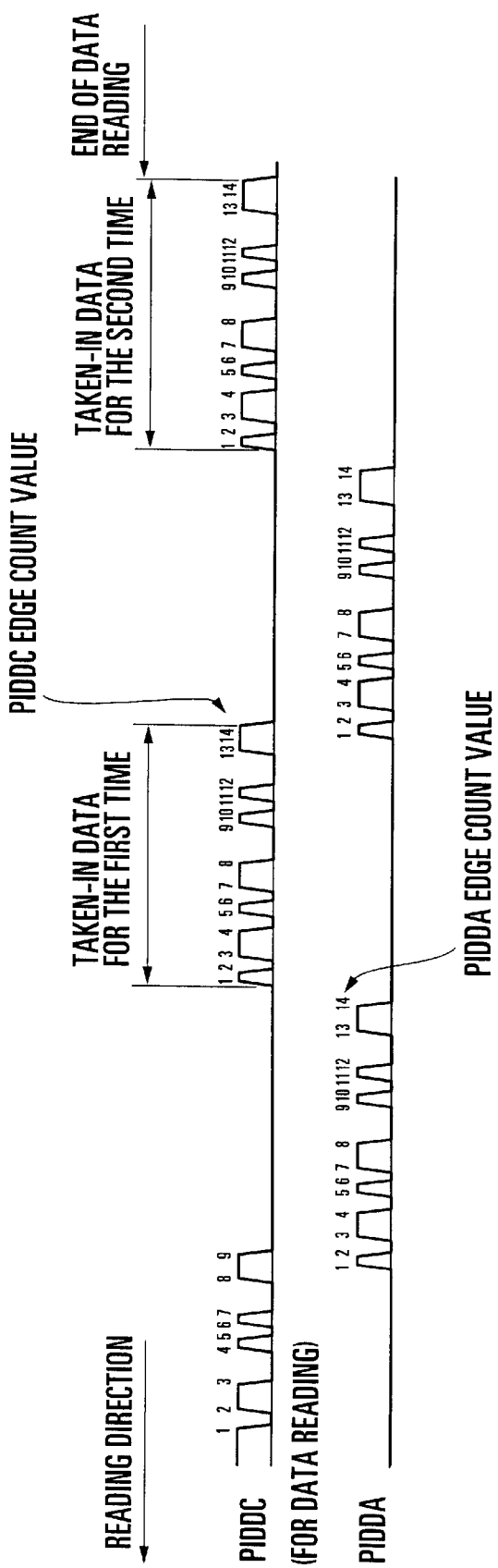
FIG. 14 is a timing chart aiding in explaining the operation shown in FIG. 13.

FIG. 14 is a timing chart showing the above-described data reading operation. As is understandable from the above description and the timing chart of FIG. 14, the values of the PIDDC pulse width time memory stored in the above step S109 until the value of the PIDDC edge counter becomes "14" from "1" after the value of the PIDDA edge counter has become "14" are converted into numerical data, which are stored as data read for the first time. Similarly, data read for the second time are stored.

A series of operations of the control circuit 107 including the data reading operations and parity check operations for two times will be described with reference to the flow chart of FIG. 15.

First, in step S121, the light-receiving detection level and the light-emission level are set in the PIDDC detecting circuit 105. In the next step S122, the light-receiving detection level and the light-emission level are set in the PIDDA detecting circuit 106. Then, in step S123, the data reading for the first time by the photo-sensor PIDDC is performed in the way as described with reference to FIG. 13. In the subsequent step S124, the newest data read by the photo-sensor PIDDC is copied to the immediately-older data. Concretely speaking, data DDC_ELC_NEW is set to data DDC_ELC_OLD, data DDC_GC1_NEW is set to data DDC_GC1_OLD, and data DDC_GC2_NEW is set to data DDC_GC2_OLD. Then, in step S125, the data reading for the second time by the photo-sensor PIDDC is performed in the way as described with reference to FIG. 13.

In the next step S126, the data read for the first time and the data read for the second time are compared with each other. Thus, a comparison between the newest data DDC_ELC_NEW (for the second time) and the immediately-older data DDC_ELC_OLD (for the first time), a comparison between the newest data DDC_GC1_NEW (for the second time) and the immediately-older data DDC_GC1_OLD (for the first time), and a comparison between the newest data DDC_GC2_NEW (for the second time) and the immediately-older data DDC_GC2_OLD (for the first time) are performed. Then, in step S127, a check is made to find if a result of each of the above comparisons is O.K. (the reading of data is successful). If so, the flow proceeds to step S128. If not, the flow returns to step S123 to perform the data reading again, thereafter repeating the above operation.

In step S128, the parity check of data is performed. The details of the parity check have no direct relation with the invention, and are, therefore, omitted from the further description. If the result of the parity check is N.G., the flow is brought to an end, determining that the data reading has ended in failure, and if the result of the party check is O.K., the flow is brought to an end, determining that the data reading has been normally completed (steps S129 and S130).

In the apparatus which has been described in the foregoing, in order to enhance the reliability of data read from the data disk 102, the data reading is performed twice by means of the photo-sensor PIDDC. Therefore, it is always necessary to cause the data disk 102 to make two rotations.

In the following, a data disk reading apparatus according to the fourth embodiment of the invention will be described in detail.

The circuit arrangement of the data disk reading apparatus according to the fourth embodiment of the invention is the same as that shown in FIG. 9, and the following description is made using the reference numerals used in FIG. 9.

FIG. 16 is a diagram showing memories (including counters) which store data to be used in the control circuit 107 in the fourth embodiment of the invention. Here, memories and counters ("a" to "m") which are the same as those described with reference to FIG. 11 are omitted from the following description, and only memories which are newly added (only memories which are added in order to use both the photo-sensors PIDDC and PIDDA for data reading) are described below.

Referring to FIG. 16, "n" denotes a PIDDA pulse-width time memory which stores pulse width time data (t1 to t13 for one rotation: 13 areas) read from the data disk 102 by the photo-sensor PIDDA, "o" denotes a DDA_ELC_NEW data memory which stores the newest value of numerical data (3 bits) found from the PIDDA pulse width time data, "p" denotes a DDA_GC1_NEW data memory which stores the newest value of numerical data (5 bits) found from the PIDDA pulse width time data, "q" denotes a DDA_GC2_NEW data memory which stores the newest value of numerical data (5 bits) found from the PIDDA pulse width time data, "r" denotes a DDA_ELC_OLD data memory which stores the immediately-older value of numerical data (3 bits) found from the PIDDA pulse width time data, "s" denotes a DDA_GC1_OLD data memory which stores the immediately-older value of numerical data (5 bits) found from the PIDDA pulse width time data, and "t" denotes a DDC_GC2_OLD data memory which stores the immediately-older value of numerical data (5 bits) found from the PIDDA pulse width time data. Further, "u" denotes a DDC data taking-in end flag PIDDC_endf, which is set on the condition of "PIDDC_EC=14", indicating that the data reading by the photo-sensor PIDDC has been completed. "v" denotes a DDA data taking-in end flag PIDDA_endf, which is set on the condition of "PIDDA_EC=14", indicating that the data reading by the photo-sensor PIDDA has been completed.

In the apparatus as described in the foregoing with reference to FIGS. 9 to 15, in order to enhance the reliability of data reading, the data disk 102 is made to make two rotations, and the data disk 102 is read by the photo-sensor PIDDC for each of the two rotations. Then, two results of data reading are compared with each other for verification. Therefore, a relatively long period of time is required for data reading.

On the other hand, in the data disk reading apparatus according to the fourth embodiment of the invention, the data reading is performed by using not only the photo-sensor PIDDC but also the photo-sensor PIDDA, which is used only for preparing the timing of data reading in the case of the apparatus shown in FIGS. 9 to 15. Thus, the data reading is performed by both the photo-sensor PIDDC and the photo-sensor PIDDA, so that the data reading is performed twice during one rotation of the data disk 102 (in this case, the burden of preparing the timing of data reading is borne by one of the photo-sensor PIDDC and the photo-sensor PIDDA which is not being used for data reading at present). Then, two results of data reading are compared with each other for verification. Accordingly, it is possible to reduce by half a period of time required for data reading while assuring the reliability of data reading. Thus, according to the fourth embodiment of the invention, there is attained a camera capable of reducing the photo-taking preparing time required from the loading of a new film into the camera until the camera becomes ready for photo-taking, i.e., having a good operability.

Figure 17:
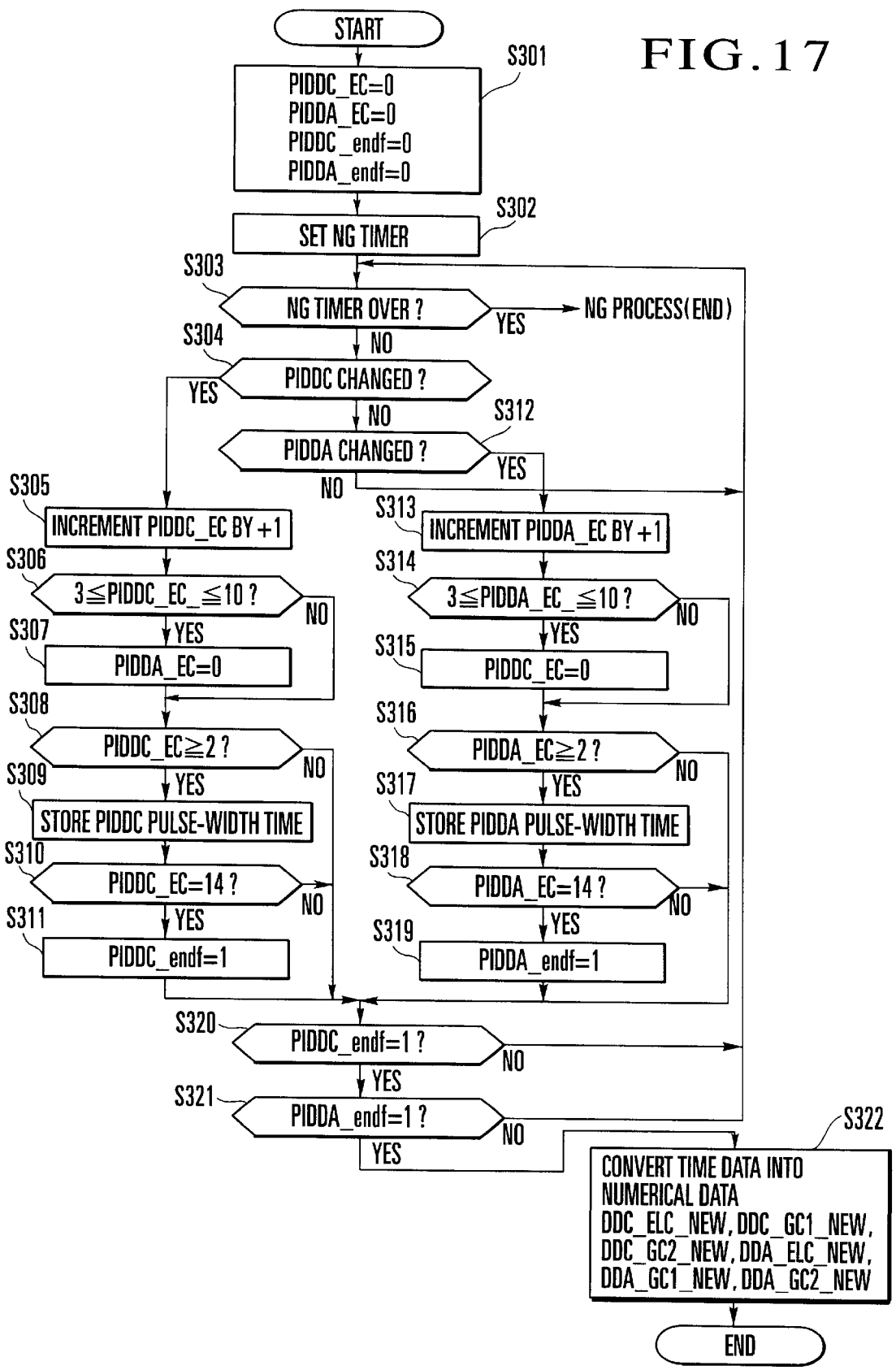
FIG. 17 is a flow chart showing the operation during the data reading in the fourth embodiment of the invention.

Next, the operation during the data reading according to the fourth embodiment of the invention will be described with reference to the flow chart of FIG. 17.

First, in step S301, prior to performing the data reading, a count value PIDDC_EC (the value of the PIDDC edge counter), a count value PIDDA_EC (the value of the PIDDA edge counter), a flag PIDDC_endf (PIDDC data taking-in end flag) and a flag PIDDA_endf (PIDDA data taking-in end flag) are initialized. In the next step S302, an NG timer, which is provided for terminating the present sequence when it is impossible to take in output signals, is set. Then, in step S303, a check is made to find if the time set at the NG timer has been up. If so, the flow is brought to an end as the process is N.G.

If the time set at the NG timer has not yet been up, the flow proceeds to step S304. In step S304, a check is made to find if the output of the photo-sensor PIDDC has changed. If so, the flow proceeds to step S305. In step S305, the count value PIDDC_EC is incremented by one to continue counting. Then, in step S306, a check is made to find if the count value PIDDC_EC satisfies a condition of "3 ≦PIDDC_EC ≦10". If not, the flow proceeds to step S308. If, so, the flow proceeds to step S307. In step S307, the count value PIDDA_EC is set to "PIDDA_EC=0" to clear the PIDDA edge counter. Then, since the PIDDA edge counter has been cleared as "PIDDA_EC=0", when data (pulse) is read by the photo-sensor PIDDA for the next time, the counting operation from "1" is again started.

Incidentally, the reason why the PIDDA edge counter is not made to be cleared on the condition of "1≦PIDDC_EC≦14" is as follows. There is a possibility that the first one pulse of one of the output signal of the photo-sensor PIDDA and the output signal of the photo-sensor PIDDC and the last one pulse of the other overlap each other temporally. Therefore, if the count value PIDDA_EC is made to be cleared on condition that a change has occurred in the output of the photo-sensor PIDDC, there is a possibility that it is impossible to count the first pulse or last pulse of the photo-sensor PIDDA.

In the next step S308, a check is made to find if the count value PIDDC_EC satisfies a condition of "PIDDC_EC≧2". If so, the flow proceeds to step S309. In step S309, pulse width time data (a difference between the time of an edge n+1 and the time of an edge n) is stored in the PIDDC pulse width time memory. Further, in the case of "PIDDC edge counter=1", there exists no pulse width, so that, with the step S309 canceled, the flow immediately proceeds to step S320. In the next step S310, a check is made to find if the count value PIDDC_EC satisfies a condition of "PIDDC_EC=14". If not, the flow proceeds to step S320. If so, the flow proceeds to step S311. In step S311, the PIDDC data taking-in end flag is set (PIDDC_endf=1).

In a case where the output of the photo-sensor PIDDC has not changed in the above step S304, the flow proceeds to step S312. In step S312, a check is made to find if the output of the photo-sensor PIDDA has changed. If not, the flow returns to step S303. If so, the flow proceeds to step S313. In step S313, the count value PIDDA_EC is incremented by one to continue counting. Then, in step S314, a check is made to find if the count value PIDDA_EC satisfies a condition of "3≦PIDDA_EC≦10". If not, the flow proceeds to step S316. If, so, the flow proceeds to step S315. In step S315, the count value PIDDC_EC is set to "PIDDC_EC=0" to clear the PIDDC edge counter. Then, since the PIDDC edge counter has been cleared as "PIDDC_EC=0", when data (pulse) is read by the photo-sensor PIDDC for the next time, the counting operation from "1" is again started.

Incidentally, the reason why the PIDDC edge counter is not made to be cleared on the condition of "1≦PIDDA_EC≦14" is as follows. There is a possibility that the first one pulse of one of the output signal of the photo-sensor PIDDA and the output signal of the photo-sensor PIDDC and the last one pulse of the other overlap each other temporally. Therefore, if the count value PIDDC_EC is made to be cleared on condition that a change has occurred in the output of the photo-sensor PIDDA, there is a possibility that it is impossible to count the first pulse or last pulse of the photo-sensor PIDDC.

In the next step S316, a check is made to find if the count value PIDDA_EC satisfies a condition of "PIDDA_EC≧2". If so, the flow proceeds to step S317. In step S317, pulse width time data (a difference between the time of an edge n+1 and the time of an edge n) is stored in the PIDDA pulse width time memory. Further, in the case of "PIDDA edge counter=1", there exists no pulse width, so that, with the step S317 canceled, the flow immediately proceeds to step S320. In the next step S318, a check is made to find if the count value PIDDA_EC satisfies a condition of "PIDDA_EC=14". If not, the flow proceeds to step S320. If so, the flow proceeds to step S319. In step S319, the PIDDA data taking-in end flag is set (PIDDA_endf=1).

In step S320, a check is made to find if a condition of "PIDDC_endf=1" of the PIDDC data taking-in end flag is satisfied, and in step S321, a check is made to find if a condition of "PIDDA_endf=1" of the PIDDA data taking-in end flag is satisfied. If both the conditions are satisfied, the flow proceeds to step S322. If either one of the conditions is not satisfied, i.e., if the data taking-in operation has not yet been completed, the flow returns to step S303, thereafter repeating the above-described operation.

In step S322, the values of the PIDDC pulse width time memory and the PIDDA pulse width time memory are respectively converted into numerical data in accordance with pulse width time lengths. In other words, the values of the PIDDC pulse width time memory are stored as data DDC_ELC_NEW, DDC_GC1_NEW and DDC_GC2_NEW, and the values of the PIDDA pulse width time memory are stored as data DDA_ELC_NEW, DDA_GC1_NEW and DDA_GC2_NEW.

According to the above-described method, it is possible to read data for two times per one rotation of the data disk 102.

Figure 18:
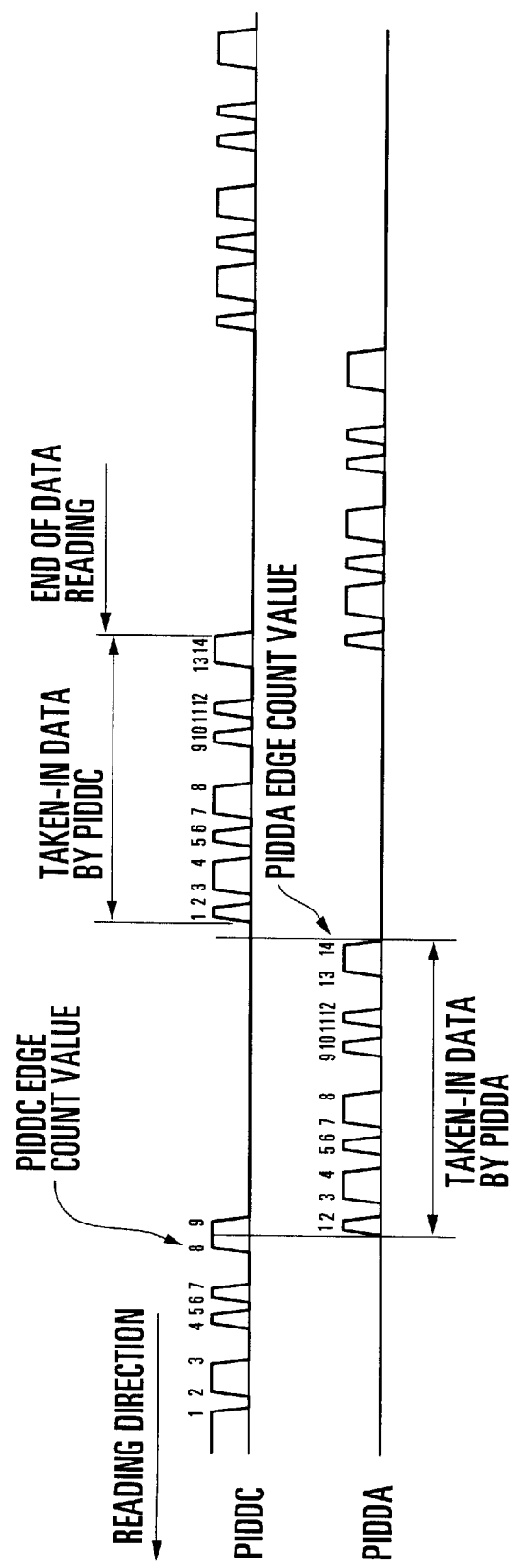
FIG. 18 is a timing chart aiding in explaining the operation shown in FIG. 17.

FIG. 18 is a timing chart showing the above-described data reading operation. As is understandable from the above description and the timing chart of FIG. 18, the values of the PIDDA pulse width time memory stored in the above step S317 until the value of the PIDDA edge counter becomes "14" from "1" and the values of the PIDDC pulse width time memory stored in the above step S309 until the value of the PIDDC edge counter becomes "14" from "1" are respectively converted into numerical data, which are stored as data read for two times.

In the meantime, taking the structural arrangement of a film cartridge into consideration, there is a possibility that the rotation speed of the data disk varies at a place due to the interference of the film end with a member disposed inside the film cartridge. Such variation of the rotation speed occurs at the same place on the data disk 102. Therefore, in the case of the apparatus shown in FIGS. 9 to 15, if the above variation of the rotation speed occurs during the data reading by the photo-sensor, it becomes impossible to accurately read the pulse width, so that a parity error would tend to occur.

In the fourth embodiment of the invention, in view of the above point, the reading of data from the data disk 102 is performed by both the photo-sensor PIDDC and the photo-sensor PIDDA, and, if an abnormal value (parity error) has occurred in data read by one of the photo-sensor PIDDC and the photo-sensor PIDDA, the data reading is performed again. Then, only two data considered to be normal are compared with each other for verification. Accordingly, it is possible to prevent any reading error from occurring. More specifically, if a parity error has occurred in data read by the photo-sensor PIDDC, the data reading is performed again, and data for the first time and data for the second time which have been obtained by the photo-sensor PIDDA are compared with each other for verification.

According to the above-described method, it is possible to prevent the occurrence of any parity error due to the variation of the rotation speed of the data disk, without impairing the reliability of data reading.

Figure 19:
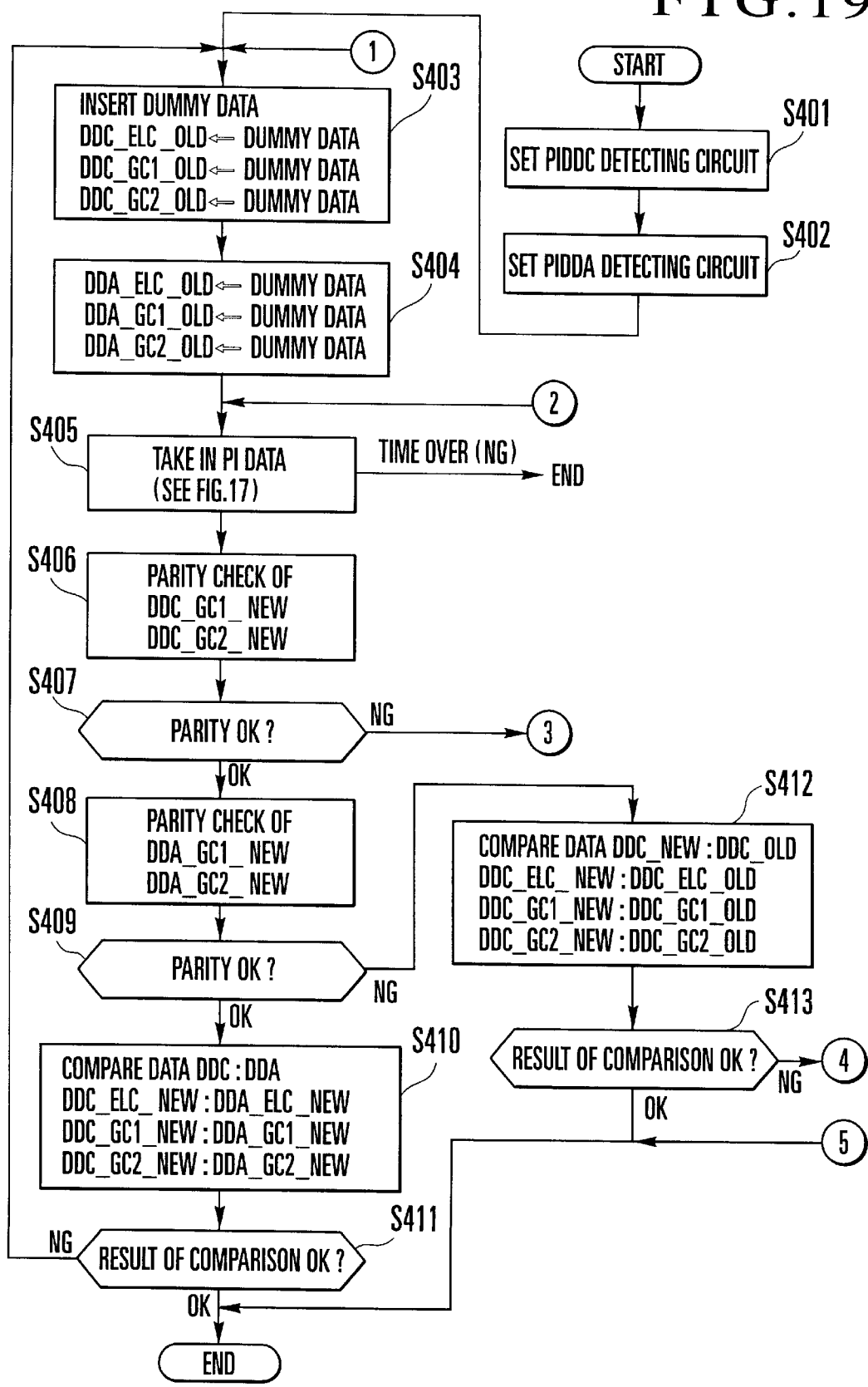
FIG. 19 is a flow chart showing a series of operations including the operation during the data reading in the fourth embodiment of the invention.

A series of operations of the control circuit 107 for effecting the above-described method will be described with reference to the flow charts of FIGS. 19 and 20.

First, in step S401, the light-receiving detection level and the light-emission level are set in the PIDDC detecting circuit 105. In the next step S402, the light-receiving detection level and the light-emission level are set in the PIDDA detecting circuit 106. Then, in step S403, dummy data, which are usually unavailable, are inserted into storage areas for immediately-older data obtained by the photo-sensor PIDDC. These dummy data are used for the first data comparison of data obtained by the photo-sensor PIDDC, in a case where a parity error has occurred in data obtained by the photo-sensor PIDDA. More specifically, dummy data of "000B" is added to data DDC_ELC_OLD, dummy data of "00000B" is added to data DDC_GC1_OLD, and dummy data of "00000B" is added to data DDC_GC2_OLD.

In the next step S404, dummy data, which are usually unavailable, are inserted into storage areas for immediately-older data obtained by the photo-sensor PIDDA. These dummy data are used for the first data comparison of data obtained by the photo-sensor PIDDA, in a case where a parity error has occurred in data obtained by the photo-sensor PIDDC. More specifically, dummy data of "000B" is added to data DDA_ELC_OLD, dummy data of "00000B" is added to data DDA_GC1_OLD, and dummy data of "00000B" is added to data DDA_GC2_OLD.

Then, in step S405, the data reading by the photo-sensors PIDDC and PIDDA is performed in the way as described with reference to FIG. 17. In the subsequent step S406, the parity check of data DDC_GC1_NEW and data DDC_GC2_NEW is performed. If, in the next step S407, the result of the parity check is O.K., the flow proceeds to step S408. In step S408, the parity check of data DDA_GC1_NEW and data DDA_GC2_NEW is performed. If, in the next step S409, the result of the parity check is O.K., the flow proceeds to step S410, determining that there is no parity error due to the variation of the rotation speed of the data disk 102. In step S410, the newest data obtained by the photo-sensor PIDDC and the newest data obtained by the photo-sensor PIDDA are compared with each other. More specifically, a comparison between the data DDC_ELC_NEW and the data DDA_ELC_NEW, a comparison between the DDC_GC1_NEW and the data DDA_GC1_NEW, and a comparison between the data DDC_GC2_NEW and the data DDA_GC2_NEW are performed. Then, in step S411, a check is made to find if a result of each of the above comparisons is O.K. If so, as the data taken in for two times are identical with each other, the flow is brought to an end. If not, the flow returns to step S403 to perform the data reading again, thereafter repeating the above operation.

Figure 20:
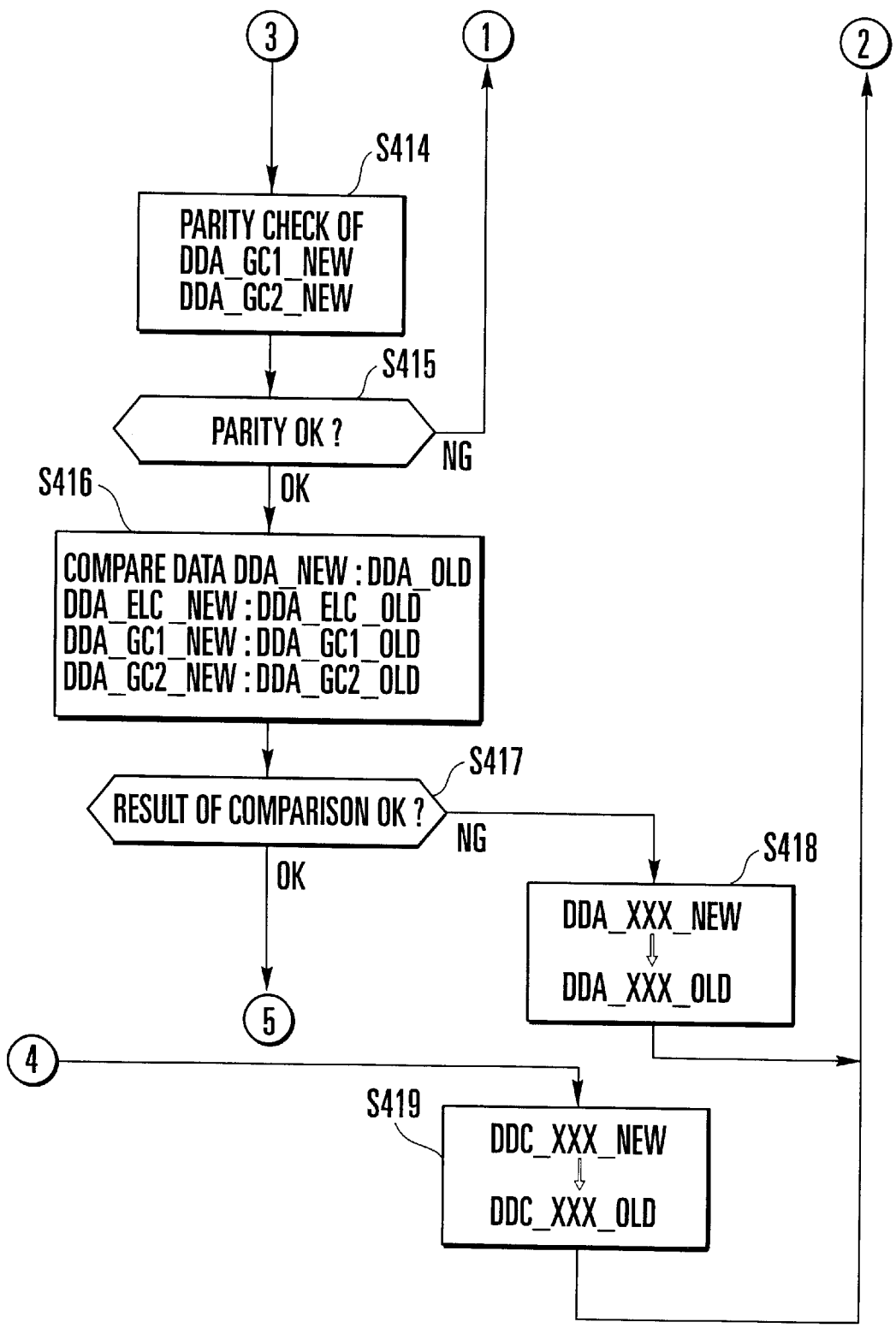
FIG. 20 is a flow chart showing the operation continuing from the operation shown in FIG. 19.

If, in the above step S407, the result of the parity check is N.G., the flow proceeds to step S414 shown in FIG. 20. In step S414, the parity check for data obtained by the photo-sensor PIDDA is performed (DDC_GC2_NEW and DDA_GC2_NEW). In the next step S415, if the result of the parity check is N.G., the flow returns to step S403 shown in FIG. 19, to perform the data reading again. If the result of the parity check is O.K., the flow proceeds to step S416. In step S416, the newest data and the immediately-older data obtained by the photo-sensor PIDDA are compared with each other. More specifically, a comparison between the data DDA_ELC_NEW and the data DDA_ELC_OLD, a comparison between the data DDA_GC1_NEW and the data DDA_GC1_OLD, and a comparison between the data DDA_GC2_NEW and the data DDA_GC2_OLD are performed. Then, in step S417, a check is made to find if a result of each of the above comparisons is O.K. In the first cycle of flow, since dummy data is included in the data to be subjected to the comparison, the result of each of the above comparisons becomes necessarily N.G. After the data for the second time is taken in, if the data for the second time is identical with the data for the first time, the result of each of the above comparisons becomes O.K., so that the flow is brought to an end.

If, in the above step S417, the result of each of the above comparisons is N.G., the flow proceeds to step S418. In step S418, the newest data read by the photo-sensor PIDDA is copied to the immediately-older data. Concretely speaking, the data DDA_ELC_NEW is set to the data DDA_ELC_OLD, the data DDA_GC1_NEW is set to the data DDA_GC_OLD, and the data DDA_GC2_NEW is set to the data DDA_GC2_OLD. Then, the flow returns to step S405 shown in FIG. 19 to perform the data reading again.

Further, if, in the above step S409, the result of the parity check is N.G., the flow proceeds to step S412. In step S412, the newest data and the immediately-older data obtained by the photo-sensor PIDDC are compared with each other. More specifically, a comparison between the data DDC_ELC_NEW and the data DDC_ELC_OLD, a comparison between the data DDC_GC1_NEW and the data DDC_GC1_OLD, and a comparison between the data DDC_GC2_NEW and the data DDC_GC2_OLD are performed. Then, in step S413, a check is made to find if a result of each of the above comparisons is O.K. In the first cycle of flow, since dummy data is included in the data to be subjected to the comparison, the result of each of the above comparisons becomes necessarily N.G. After the data for the second time is taken in, if the data for the second time is identical with the data for the first time, the result of each of the above comparisons becomes O.K., so that the flow is brought to an end.

If, in the above step S413, the result of each of the above comparisons is N.G., the flow proceeds to step S419. In step S419, the newest data read by the photo-sensor PIDDC is copied to the immediately-older data. Concretely speaking, the data DDC_ELC_NEW is set to the data DDC_ELC_OLD, the data DDC_GC1_NEW is set to the data DDC_GC1_OLD, and the data DDC_GC2_NEW is set to the data DDC_GC2_OLD. Then, the flow returns to step S405 shown in FIG. 19 to perform the data reading again.

Incidentally, although not shown in the above flow charts, if the number of times for which the data reading is performed again after the result of the parity check is N.G. or the result of the comparison is N.G. exceeds a predetermined value, the data reading is brought to an end, determining that the film cartridge is out of order, and an error indication is made on the display part 108 shown in FIG. 9.

According to the fourth embodiment of the invention as described above, the data reading from the data disk is performed by both the photo-sensor PIDDA and the photo-sensor PIDDC. Therefore, it is possible to reduce by half the required reading period of time. Further, if a parity error has occurred in data read by one of the photo-sensor PIDDA and the photo-sensor PIDDC, the data reading is performed again, and data for the first time and data for the second time obtained by the other of the photo-sensor PIDDA and the photo-sensor PIDDC are compared with each other for verification. Therefore, it is possible to prevent the occurrence of any parity error due to the variation of the rotation speed of the data disk.

Although, in the fourth embodiment, data is read by using a photo-sensor, data may be read by using a magnetic sensor if the data disk has not a bar code but magnetically-recorded information.

Further, the data disk is supposed to be of a disk shape, but may be a linearly-moving member.

In addition, the invention is applicable also to a cartridge of the type other than the film cartridge described in the fourth embodiment, a cartridge having a recording medium other than film, other kinds of cartridges, and members other than the cartridge to be loaded or ejected, such as a battery.

In addition, the invention, which is applied to the camera in the fourth embodiment, is applicable to optical apparatuses other than the camera, other apparatuses, devices adapted for the camera, the optical apparatuses or the other apparatuses, and elements constituting these apparatuses or devices.

As described in the foregoing, according to the fourth embodiment of the invention, there is provided a data reading apparatus capable of greatly reducing a period of time required for data reading while assuring the reliability of data reading.

Further, according to the fourth embodiment of the invention, there is provided a data reading apparatus capable of preventing the occurrence of any error of data reading due to the variation of the moving speed of an information storing member or the variation of the rotation speed of a data storing disk or a bar code disk.

What is claimed is:

1. A data reading apparatus adapted for a film cartridge having a data recording part provided on a predetermined moving member, said data reading apparatus comprising:

a first reading device which reads data from the data recording part;

a second data reading device which reads data from a data recording part and which is disposed at a position different from that of said first data reading device with respect to a moving direction of the data recording part; and a data obtaining circuit which makes a comparison between data read by said first data reading device and data read by said second data reading device and obtains, on the basis of a result of the comparison, data corresponding to data on the data recording part, said data obtaining circuit including means for, if data read by said first data reading device and data read by said second data reading device are identical with each other, obtaining the data as data corresponding to data recorded on the data recording part.

2. A data reading apparatus according to claim 1, wherein the data recording part makes a rotational movement, and wherein said first data reading device and said second data reading device are disposed at respective positions which differ in rotational phase of the data recording part.

3. A data reading apparatus according to claim 2, wherein the data recording part is provided on a predetermined rotational phase portion of a rotating member, and wherein one of said first data reading device and said second data reading device includes means for performing a data reading operation before the rotating member completes making one rotation after the other of said first data reading device and said second data reading device performs a data reading operation.

4. A data reading apparatus according to claim 1, wherein said data obtaining circuit includes means for, if data read by said first data reading device and data read by said second data reading device are not identical with each other, not adopting the data as data corresponding to data recorded on the data recording part.

5. A data reading apparatus according to claim 1, wherein said data obtaining circuit includes means for, if data read by said first data reading device and data read by said second data reading device are not identical with each other, causing at least one of said first reading device and said second reading device to perform a data reading operation.

6. A data reading apparatus according to claim 1, wherein each of said first reading device and said second reading device includes means for performing a data reading operation optically.

7. A data reading apparatus according to claim 1, wherein each of said first reading device and said second reading device includes means for performing a data reading operation magnetically.

8. A data reading apparatus according to claim 1, wherein the data recording part is provided on the film cartridge.

9. A data reading apparatus according to claim 1, wherein the data recording part is provided on a rotating member provided on the film cartridge.

10. A data reading apparatus according to claim 9, wherein the data recording part is provided on a rotating member which rotates with a film winding shaft of the film cartridge.

11. A data reading apparatus according to claim 1, wherein the data recording part is composed of a bar code.

12. A camera adapted for a film cartridge having a data recording part provided on a predetermined moving member, said camera comprising:

a first data reading device which reads data from the data recording part;

a second data reading device which reads data from the data recording part and which is disposed at a position different from that of said first data reading device with respect to a moving direction of the data recording part; and a data obtaining circuit which makes a comparison between data read by said first data reading device and data read by said second data reading device and obtains, on the basis of a result of the comparison, data corresponding to data recorded on the data recording part, said data obtaining circuit including means for, if data read by said first data reading device and data read by said second data reading device are identical with each other, obtaining the data as data corresponding to data recorded on the data recording part.

13. A data reading apparatus adapted for a film cartridge having a data recording part provided on a predetermined moving member, said data reading apparatus comprising:

a first data reading device which reads data from the data recording part;

a second data reading device which reads data from the data recording part and which is disposed at a position different from that of said first data reading device with respect to a moving direction of the data recording part; and a data obtaining circuit which can make comparisons between data read by said first data reading device and data read by said second data reading device and between data successively read by said first data reading device to obtain data corresponding to data recorded on the data recording part.

14. A camera adapted for a film cartridge having a data recording part provided on a predetermined moving member, said camera comprising:

a first data reading device which reads data from the data recording part;

a second data reading device which reads data from the data recording part and which is disposed at a position different from that of said first data reading device with respect to a moving direction of the data recording part; and a data obtaining circuit which can make comparisons between data read by said first data reading device and data read by said second data reading device and between data successively read by said first data reading device to obtain data corresponding to data recorded on the data recording part.

* * * * *

UNITED STATES PATENT AND TRADEMARK OFFICE
CERTIFICATE OF CORRECTION

PATENT NO.     : 6,381,417 B1
DATED          : April 30, 2002
INVENTOR(S)    : Masayuki Yano et al.

It is certified that error appears in the above-identified patent and that said Letters Patent is hereby corrected as shown below:

<u>Column 7,</u>
Line 30, delete "composed god of" and insert -- composed of --.

<u>Column 10,</u>
Line 46, delete "Sill" and insert -- S111 --.
Line 47, delete "Sill" and insert -- S111 --.

Signed and Sealed this

Fourteenth Day of January, 2003

JAMES E. ROGAN
*Director of the United States Patent and Trademark Office*